(12) United States Patent
Van Luchene

(10) Patent No.: US 7,974,901 B2
(45) Date of Patent: Jul. 5, 2011

(54) VIDEO GAME WITH CHARACTER PARAMETERS DERIVED FROM OTHER CHARACTERS

(75) Inventor: Andrew Van Luchene, Santa Fe, NM (US)

(73) Assignee: Leviathan Entertainment, LLC, Santa Fe, NM (US)

( * ) Notice: Subject to any disclaimer, the term of this patent is extended or adjusted under 35 U.S.C. 154(b) by 0 days.

(21) Appl. No.: 12/724,993

(22) Filed: Mar. 16, 2010

(65) Prior Publication Data

US 2010/0173701 A1 Jul. 8, 2010

Related U.S. Application Data

(63) Continuation-in-part of application No. 11/560,456, filed on Nov. 16, 2006, now abandoned, and a continuation-in-part of application No. 11/279,991, filed on Apr. 17, 2006, now Pat. No. 7,677,973, and a continuation-in-part of application No. 11/368,143, filed on Mar. 3, 2006, now Pat. No. 7,677,974, and a continuation-in-part of application No. 11/380,489, filed on Apr. 27, 2006, now abandoned, and a continuation-in-part of application No. 11/624,659, filed on Jan. 18, 2007, now Pat. No. 7,677,975, and a continuation-in-part of application No. 11/355,232, filed on Feb. 14, 2006, and a continuation-in-part of application No. 11/428,263, filed on Jun. 30, 2006, and a continuation-in-part of application No. 11/671,373, filed on Feb. 5, 2007, now Pat. No. 7,677,979, and a continuation-in-part of application No. 11/670,304, filed on Feb. 1, 2007, now abandoned.

(51) Int. Cl.
*G06Q 40/00* (2006.01)

(52) U.S. Cl. .................. 705/35; 463/1; 463/16; 463/25; 463/29; 463/43

(58) Field of Classification Search .................... 705/35; 463/1–43

See application file for complete search history.

(56) References Cited

U.S. PATENT DOCUMENTS

| | | | |
|---|---|---|---|
| 7,438,640 B2 * | 10/2008 | Amour | 463/25 |
| 7,537,521 B2 * | 5/2009 | Amour | 463/25 |
| 2002/0123956 A1 * | 9/2002 | Galuten | 705/37 |
| 2003/0003999 A1 * | 1/2003 | Kobayashi | 463/43 |
| 2005/0009600 A1 * | 1/2005 | Rowe et al. | 463/29 |
| 2005/0119040 A1 * | 6/2005 | Berman et al. | 463/16 |
| 2005/0267610 A1 * | 12/2005 | Shinoda | 700/92 |
| 2006/0063575 A1 * | 3/2006 | Gatto et al. | 463/1 |
| 2006/0079331 A1 * | 4/2006 | Moshal | 463/42 |
| 2007/0054716 A1 * | 3/2007 | Hiruta | 463/1 |
| 2007/0287533 A1 * | 12/2007 | Amour | 463/26 |
| 2007/0293305 A1 * | 12/2007 | Amour | 463/25 |

* cited by examiner

*Primary Examiner* — Narayanswamy Subramanian

(57) ABSTRACT

In various embodiments, apparatus and processes permit a video game in which there are relationships between player characters, karma points employed, and death and reincarnation of player characters.

7 Claims, No Drawings

VIDEO GAME WITH CHARACTER PARAMETERS DERIVED FROM OTHER CHARACTERS

This application is a continuation-in-part of each of the following U.S. patent applications, and each of the following applications is incorporated herein by reference:

U.S. patent application Ser. No. 11/560,456, entitled "Exchanges in a Virtual Environment", filed Nov. 16, 2006 now abandoned;

U.S. patent application Ser. No. 11/279,991, entitled "Securing Virtual Contracts with Credit", filed Apr. 17, 2006 now U.S. Pat. No. 7,667,973;

U.S. patent application Ser. No. 11/368,143, entitled "Video Game Methods and Systems", filed Mar. 3, 2006 now U.S. Pat. No. 7,677,974;

U.S. patent application Ser. No. 11/380,489, entitled "Multiple Purchase Options for Virtual Purchases", filed Apr. 27, 2006 now abandoned;

U.S. patent application Ser. No. 11/624,659, entitled "Video Game with Registration of Funding Sources", filed Jan. 18, 2007 now U.S. Pat. No. 7,677,975;

U.S. patent application Ser. No. 11/355,232, entitled "Online Game Environment that Facilitates Binding Contracts between Players," filed Feb. 14, 2006;

U.S. patent application Ser. No. 11/428,263, entitled "Video Game Environment" filed Jun. 30, 2006;

U.S. patent application Ser. No. 11/671,373, entitled "Video Game with Control of Quantities of Raw Materials", filed Feb. 5, 2007 now U.S. Pat. No. 7,677,979; and U.S. patent application Ser. No. 11/670,304, entitled "Method and System for Allocating Resources in a Video Game", filed Feb. 1, 2007 now abandoned.

DETAILED DESCRIPTION

The following sections I-X provide a guide to interpreting the present application.

I. Terms

The term "product" means a machine, manufacture and/or composition of matter, unless expressly specified otherwise.

The term "process" means a process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere description of a process, or in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the invention", unless expressly specified otherwise. Two or more described embodiments may or may not be mutually exclusive. The mere fact that two embodiments are described, or that two embodiments are described in proximity to each other or in conjunction with each other, does not imply that the two embodiments are mutually exclusive. A described embodiment may or may not be strictly narrower than and encompassed by another described embodiment. The mere fact that two embodiments are described, or that two embodiments are described in proximity to each other or in conjunction with each other, does not imply that one of the embodiments is strictly narrower than and encompassed by the other embodiment.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise. Similarly, the mere fact that two (or more) embodiments are referenced does not imply that those embodiments are mutually exclusive.

One embodiment of the invention may cover or embrace more than one other embodiment of the invention. For example, a first embodiment comprising elements a, b, and c may cover a second embodiment that comprises elements a, b, c, and d as well as a third embodiment covering elements a, b, c, and e. Similarly, each of the first, second, and third embodiments would cover a fourth embodiment comprising elements a, b, c, d, and e.

The terms "including", "comprising" and variations thereof mean "including but not necessarily limited to", unless expressly specified otherwise. Thus, for example, the sentence "the machine includes a red widget and a blue widget" means the machine includes the red widget and the blue widget, but may possibly include one or more other items as well as another example, the sentence "Examples of machines include a computer and a motor" means that one example of a machine is a computer, another example of a machine is a motor, and there may be other examples (e.g., things that are neither computers nor motors may nevertheless be a machine)

The term "consisting of" and variations thereof mean "including and also limited to", unless expressly specified otherwise. Thus, for example, the sentence "the machine consists of a red widget and a blue widget" means the machine includes the red widget and the blue widget, but does not include anything else.

The term "compose" and variations thereof mean "to make up the constituent parts of, component of or member of", unless expressly specified otherwise. Thus, for example, the sentence "the red widget and the blue widget compose a machine" means the machine includes the red widget and the blue widget.

The term "exclusively compose" and variations thereof mean "to make up exclusively the constituent parts of, to be the only components of, or to be the only members of", unless expressly specified otherwise. Thus, for example, the sentence "the red widget and the blue widget exclusively compose a machine" means the machine consists of the red widget and the blue widget (i.e. and nothing else).

The indefinite articles "a" and "an" and the definite article "the" refer to "one or more" of the noun modified by that article, unless expressly specified otherwise. Thus, for example, the phrase "a widget" means one or more widgets, unless expressly specified otherwise. Similarly, after reciting the phrase "a widget", a subsequent recitation of the phrase "the widget" means "the one or more widgets". Accordingly, it should be understood that the word "the" may also refer to a specific term having antecedent basis. For example, if a paragraph mentions "a specific single feature" and then refers to "the specific single feature," then the word "the" should be understood to refer to the previously mentioned "a specific single feature."

The term "plurality" means "two or more", unless expressly specified otherwise.

A "set" of things (e.g., a set of widgets) may include one or more of those things (e.g., one or more widgets), which are members of the set. Whether the set includes a particular item as a member is synonymous with whether a set includes the particular item.

A "subset" of things (e.g., a subset of widgets) may include one or more of those things. A subset does not imply that there must be in the subset fewer things than in some other set of things. A subset of a particular set may include some or all of the members of the set.

A reference to a "plurality" (and like terms such as "at least one", "one or more", "set" and the like) has inherent antecedent basis for the "number" of things included in the plurality (or in the set, etc.). For example, in the phrase "receiving a plurality of commands", there is inherent antecedent basis for "the number of commands". For example, in the phrase "receiving a set of commands", there is inherent antecedent basis for "the number of commands".

The term "herein" means "in the present application, including anything which may be incorporated by reference", unless expressly specified otherwise.

The phrase "at least one of" is equivalent to "one or more of", and when either such phrase modifies a plurality of things (such as an enumerated list of things), such phrase means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things. For example, the phrase "at least one of a widget, a car and a wheel" does not mean "one widget, one car and one wheel".

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" covers both "based only on" and "based at least on". Therefore, the phrase "based on" is equivalent to the phrase "based at least on" and is also equivalent to the phrase "based at least in part on". For example, the phrase "element A is based on element B and element C" covers embodiments where element A is calculated as the product of B times C (in other words, A=B×C) and where A is calculated as the sum of B plus C (in other words, A=B+C).

The term "represent" and like terms are not exclusive, unless expressly specified otherwise. For example, the term "represents" does not mean "represents only", unless expressly specified otherwise. For example, the phrase "the data represents a credit card number" covers both "the data represents only a credit card number" and "the data represents a credit card number and the data also represents something else".

The term "whereby" is used herein only to precede a clause or other set of words that express only the intended result, objective or consequence of something that is explicitly recited before the term "whereby". Thus, when the term "whereby" is used in a claim, the clause or other words that the term "whereby" precedes do not establish specific further limitations of the claim or otherwise restrict the meaning or scope of the claim.

The terms "e.g.", "such as" and like terms mean "for example", and thus do not limit the term or phrase they explain. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "time", when used as a determined quantity, means any sort of time (e.g., time of day, day of week, date, year) on which one or more things are determined to occur.

The term "period of time" means any sort of duration (e.g., number of seconds, number of minutes, other durations) of one or more things.

The term "good" generally refers to anything which may be provided in exchange for money or other value, and thus "good" includes services, rights and items, whether tangible or intangible.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first of the two machines has a function and the second of the two machines has a function as well. The function of the first machine may or may not be the same as the function of the second machine.

Similarly, in the phrase "for each of the plurality of widgets, determining a respective price of the widget, a reference to "the widget" in that phrase means the "determining" step is applied to (performed for) each widget of the plurality of widgets. The phrase "the respective prices of the plurality of widgets" thus means the set which includes as members each respective price of the plurality of widgets.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

A numerical range includes integers and non-integers within the range, unless expressly specified otherwise. For example, the range "1 to 10" includes the integers from 1 to 10 (e.g., 1, 2, 3, 4, . . . 9, 10) and non-integers (e.g., 1.1, 1.2, . . . 1.9). A range may be denoted as non-inclusive explicitly, such as "the range of voltages from 2.5 volts to 10.3 volts exclusive", and such a range excludes 2.5 volts and excludes 10.3 volts.

A range can be continuous or discrete. For example, the range "from three meters to five meters" is a continuous range. The range "integer ranges from three meters to five meters" is a discrete range.

A range includes two ends, and each such end is, where the range is inclusive, a thing that is included in the range. Thus a range inherently has antecedent basis for the term "the ends", and has antecedent basis for the term "an end" and has antecedent basis for the terms "the first end" and "the second end". Where the range is ordered or may be ordered (e.g., a range of integers that may be ordered numerically, a range of text that may be ordered alphabetically) the range includes ends that are distinguishable because of their respective ordering. Thus a range that may be ordered has antecedent basis for terms that denote the place of the end in the ordering scheme (e.g., a range that can be numerically ordered has a "low end" and a "high end").

When used to compare values (e.g., integers, fractions) which are capable of being ordered with respect to each other, the phrase "not greater than" is equivalent to "less than or equal to". Similarly, the phrase "not less than" is equivalent to "greater than or equal to".

In reference to a plurality of things (e.g., a plurality of widgets) superlatives, where a superlative may be applied to the plurality (e.g., the largest widget of the plurality of widgets, the lowest price of the set of prices) and there is inherently antecedent basis for such superlative.

For example, for a plurality of numbers, there is inherent antecedent basis for the phrase "the greatest number of the plurality of numbers", e.g., since numbers can be ordered from least to greatest and thus the greatest number is readily and unambiguously ascertainable—the greatest number is that number of the plurality of numbers which is greater than all other numbers of the plurality of numbers. Similarly, in an embodiment where there are two equal numbers, and both numbers are greater than all other numbers in the plurality, then there are two greatest numbers.

Where two or more terms or phrases are synonymous (e.g., because of an explicit statement that the terms or phrases are synonymous), instances of one such term or phrase does not mean instances of another such term or phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, the determination of an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, heuristically "best guessing", averaging and the like.

The term "determining" does not imply that mathematical processing must be performed, and does not imply that numerical methods must be used, and does not imply that an algorithm is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to that limitation (e.g., "the widget"), this mere usage does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term, but that ordinal number does not have any other meaning or limiting effect—it is merely a convenient name. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. Thus, the mere usage of the ordinal number "first" does not indicate that there must be a "second". For example, the use of the phrase "a first widget" does not imply that there be a second widget. Accordingly, it would not be ambiguous or indefinite to use in a claim the term "a first widget" where no "second widget" is recited in that claim (or in any other claim it depends on). The mere usage of the ordinal number "second" or greater ordinal numbers does not indicate that there must be a "first" or any lesser ordinal number. For example, the use of the phrase "a second plurality of widgets" does not imply that there be a first plurality of widgets. Accordingly, it would not be ambiguous or indefinite to use in a claim the term "a second plurality of widgets" where no "first plurality of widgets" is recited in that claim (or in any other claim it depends on). A term which is labeled by an ordinal number is different than a term that is not modified by any ordinal number. For example, in a claim a reference to "a green widget" and a reference to "a second green widget" means that there are references to different widgets and thus there is no ambiguity as to whether the second green widget is or is not a reference to the green widget. The mere usage of ordinal numbers does not define a numerical limit to the features identified with the ordinal numbers. For example, the mere usage of the ordinal numbers "first" and "second" before the term "widget" does not indicate that there are exactly two widgets.

When a single device, article or other product is described herein, in another embodiment more than one device or article (whether or not they cooperate) may alternatively be used in place of the single device or article that is described. Accordingly, the functionality that is described as being possessed by a device may alternatively be possessed by more than one device or article (whether or not they cooperate) in another embodiment.

Similarly, where more than one device, article or other product is described herein (whether or not they cooperate), in another embodiment a single device or article may alternatively be used in place of the more than one device or article that is described. For example, a plurality of computer-based devices may be substituted with a single computer-based device. (Conversely, a single computer-based device may be substituted with multiple computer-based devices operating in cooperation with one another.) Accordingly, the various functionality that is described as being possessed by more than one device or article may alternatively be possessed by a single device or article.

The functionality and/or the features of a single device that is described may, in another embodiment, be alternatively embodied by one or more other devices which are described but are not explicitly described as having such functionality or features. Thus, other embodiments need not include the described device itself, but rather can include the one or more other devices which would, in those other embodiments, have such functionality or features.

IV. Disclosed Examples and Terminology are Not Limiting

Neither the Title (set forth at the beginning of the first page of the present application) nor the Abstract (set forth at the end of the present application) is to be taken as limiting in any way the scope of the disclosed invention, is to be used in interpreting the meaning of any claim or is to be used in limiting the scope of any claim. An Abstract has been included in this application merely because an Abstract is required under 37 C.F.R. §1.72(b).

The headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The disclosed inventions are widely applicable to numerous embodiments, as is readily apparent from the disclosure. One of ordinary skill in the art will recognize that the disclosed invention may be practiced with various modifications and alterations, such as structural, logical, software, and electrical modifications. Although particular features of the disclosed invention may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not be interpreted as requiring features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or (with respect to a claim and the invention defined by that claim) expressly recited in that claim.

Any preambles of the claims recite purposes, benefits and possible uses of the claimed invention only and do not limit the claimed invention.

The present disclosure is not a literal description of all embodiments of the invention. Also, the present disclosure is not a listing of features of the invention which must be present in all embodiments.

All disclosed embodiments are not necessarily covered by the claims (even including all pending, amended, issued and canceled claims). In addition, a disclosed embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long periods of time (e.g. weeks at a time). In addition, devices that are in communication with each other may communicate directly or indirectly through one or more intermediaries. Devices are in communication with one another if they are capable of one-way communication with one another. For example, a first device and a second device may be in communication with one another if the first device is capable of transmitting information to the second device, and the second device is capable of receiving information from the first device.

A description of an embodiment with several components or features does not imply that all or even any of such components or features are required. On the contrary, a variety of optional components are described to illustrate the wide variety of possible embodiments of the present invention. Unless otherwise specified explicitly, no component or feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are preferred, essential or required. Various other embodiments within the scope of the described invention include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, and a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

A "computing device" means one or more microprocessors, central processing units (CPUs), computing devices, microcontrollers, digital signal processors, graphics card, mobile gaming device, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process. For example, a description of a process is a description of an apparatus comprising a processor and memory that stores a program comprising instructions that, when executed by the processor, direct the processor to perform the process.

A computer readable medium can be in communication with a processor such that the processor can receive some or all of the instructions stored on the computer readable medium. Likewise the processor can execute some or all of the instructions stored on the computer readable medium, and can execute different instructions at different times.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The term "tangible computer-readable medium" refers to a "computer-readable medium" that comprises a hardware component, such as optical or magnetic disks, semiconductor memory (e.g., RAM, ROM, flash drives, semiconductor hard drives). Therefore, for example, a tangible computer-readable medium is not a carrier wave or an RF transmission.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth, and TCPorIP, TDMA, CDMA, and 3G; and/or (iv) encrypted to ensure privacy or prevent fraud in any of a variety of ways well known in the art.

A "user interface" is 'used by' a device, such as a computing device, to provide outputs to a user and to receive inputs from a user. For example, the user interface may direct the device to display (or otherwise provide) certain outputs (as defined by the user interface), and allow inputs to be received from the user via the device. In an embodiment, in order for the device to generate the user interface, the device executes certain instructions, e.g., instructions to output data and receive data as inputs. A user interface can include one or more output controls which output data and/or one or more input controls which allow data to be received. A type of input control allows a selection of an option from among a plurality of options, and may allow only one option to be selected, may allow one or more options to be selected, may allow that a predetermined number of options are selected, may allow that no options are selected. An input control may define the format of type of input that may be entered. A control may function as both an input control and as an output control.

A description of different capabilities of a user interface (e.g., by describing different embodiments of a user interface, by describing different things that a user interface can do) does not mean that in all embodiments the user interface must include all such described capabilities. On the contrary, such description also supports an embodiment in which, e.g., a user interface has only one of the described capabilities, and supports an embodiment in which a user interface has a particular combination of less than all of the described capabilities.

A description of a process is likewise a description of a computer-readable medium storing a program for performing the process. The computer-readable medium can store (in any appropriate format) those program elements which are appropriate to perform the method. For example, a description of a process is a description of a computer-readable storage medium that stores a program comprising instructions that, when executed by a processor, direct the processor to perform the method.

Just as the description of various steps in a process does not indicate that all the described steps are required, embodiments of an apparatus include a computer or computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as those described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified, function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal, from the scope of the invention, of additional, different embodiments, and similarly references to the description of embodiments which all include a particular feature do not indicate a disclaimer or disavowal of embodiments which do not include that particular feature. A clear disclaimer or disavowal in the present application will explicitly refer to the scope of the invention as disclaiming or disavowing certain subject matter and will also be prefaced by a phrase such as "does not include" or "cannot perform".

IX. Incorporation by Reference

Any patent, patent application or other document referred to herein is incorporated by reference into this patent application as part of the present disclosure, but only for purposes of written description and enablement in accordance with 35 U.S.C. §112, paragraph 1, and should in no way be used to limit, define, or otherwise construe any term of the present application, unless without such incorporation by reference, no ordinary meaning would have been ascertainable by a person of ordinary skill in the art. Conversely, the definitions and other subject matter explicitly set forth in this application should not be used to limit, define, or otherwise construe any term of any document incorporated herein by reference. Nothing explicitly set forth in this application should be interpreted as an admission or characterization of any prior art to this application.

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art refers to the prosecution history of the present application, but not to the prosecution history of any other patent or patent application, regardless of whether there are other patent applications that are considered related to the present application, and regardless of whether there are other patent applications that share a claim of priority with the present application.

XI. Additional Embodiments

Unless stated to the contrary, for the purposes of the present disclosure, the following terms shall have the following definitions:

Character—shall mean a persona created by a player in a video game.

Character Account—shall mean an account that tracks character attributes.

Character Attribute—shall mean any quality, trait, feature or characteristic a particular Character can have that is stored in the corresponding Character Account. Character Attributes shall include, but not be limited to:

A character score
A virtual object
The physical appearance of a character
An emblem or mark
A synthetic voice
Virtual money
Virtual help points or credits
The ability to join groups of other players at a later time
A score for subsequent matching of later game parameters
A relationship with another character
A genetic profile or makeup Character Life—shall mean a fixed period of virtual or real world time that a player character can exist in a game environment.

Character Skills—shall mean game attributes inherent or acquired by a player character during game play such as, but not limited to: the ability to cast certain spells, foretell the future, read minds, use certain weapons, cook, hunt, find herbs, assemble herbs into portions, mine, assemble objects into other objects, fly, and/or enchant other player characters.

Chat Room—shall mean an online forum where Characters can speak in written or spoken voice format.

Child—shall mean a first player character that has entered the game environment because a second and third player characters have completed a defined list of game parameters that allow the second and third player characters to be the parents of the first player character. A parent/child relationship is established via a player to player contract that defines benefits for both parties.

Chromosome—shall mean an attribute, or portion of an attribute of a player character that can be passed on to a second player character if the second player character is a child of the first player character.

City—a group of one or more buildings that is placed in a territory

Class—shall mean a certain type of character status or caste such as, but not limited to, warriors, paladins, rogues, thieves, wizards, or healers.

Coach—is a player character that can assemble a team of other player characters via a player to player contract.

Computer Generated Character—shall mean any character that is generated by the system rather than being another player character.

Death—shall mean the end of the character life of a character.

Divorce—shall mean the dissolution of a marriage contract between two player characters. The player-to-player contract that establishes a marriage can include clauses that define what each player receives in the event of a divorce.

Employee—shall mean a player character who has agreed to work for a second player character under a player to player contract that defines benefits for the both the employee and boss.

Expert Player—shall mean a player that is flagged as an expert for a given Game Parameter.

Family Member—shall mean a player character that has a parent/child relationship with one or more other player characters in the same family tree.

Family Tree—shall mean the organization of a group of player characters each of which has at least one parent/child relationship with another player character in the family tree.

Apocalypse—the last era of a game environment

Army—shall mean a group of player characters who have established player to player contracts with a general.

Billing Information—shall mean any information pertaining to billing a player including a billing address, credit card account, bank account, pay pal account or other payment information.

Boss—shall mean a player character that has other player characters working for him under player to player contracts that define benefits for both the employee and boss.

Celebrity Voice—shall mean the voice of a known celebrity in the real world.

Game Era—shall mean a duration of virtual or actual time in a game environment in which certain game parameters are available to player characters.

Game Parameter—shall mean any part of a Video Game by which characters can be measured. Game Parameters shall include, but not be limited to:

Completing all or part of a mission
Playing for a certain period of time
Winning a match against another player character or computer generated character
Reaching a certain level or score
using or obtaining an ability or technology
kill/death ratios
obtaining an object
solving a puzzle
accuracy with weapons
effective use of the proper weapon
killing a certain character/creature
getting through or to a certain geographic area
decreasing or increasing Karma Points
getting, buying, exchanging or learning a new skill or player attribute
having a child
getting married
obtaining, buying, trading, producing or developing raw materials
producing goods or services
earning income
earning a higher rank in an army
winning an election among two or more player characters
achieving deity status
improving player character status or caste
assisting other player characters with any of the above
speed of accomplishing any of the above Gender—shall mean a certain type of character such as, but not limited to, male or female.

General—shall mean a first player character who has established at least one player to player contract with another player character who is a soldier in the first player character's army.

God—Shall mean a player character that has the ability to establish conditions and game parameters in a game environment.

Government Official—Shall mean a player character that has the ability to define game parameters for other player characters.

Guild—shall mean a group of player characters who have elected to work as a team. Teams can include super groups, as those allowed in City of Heroes, Guilds, as those allowed in World of Warcraft, or Corporations, as those allowed in Eve Online.

Help Account—shall mean a sub-account of a Character Account that tracks Help Points acquired by a Character by assisting other Characters Help Credit—shall mean a credit in a Character Account acquired by successfully assisting another Character.

Help Point—shall mean a point acquired by a Character by assisting other Characters.

Inheritance—shall mean the character attributes owned by a particular player character when they die that is passed on to one or more Inheritors.

Inheritor—shall mean any player character that has been linked to a character attribute in a will, or absent a will, to the children of the dead player character.

In-game Marketplace—shall mean a virtual environment where Characters can exchange Attributes.

In-Game Voice Software—shall mean software that players can use to speak and listen to other Players whose Characters are interacting in a Video Game Environment.

Karma Points—shall mean points attributed to a player character based on how that player character performs under the player to player contracts he has established.

Marriage—shall mean a virtual contract between two players that allows them to select other player characters entering the game environment as children. A marriage is established between two player characters via a player to player contract that defines the benefits for both parties.

Massive Multi Player Online Video Game—Shall mean a Video Game that is played using either a network of a Video Game Central Server and at least two Video Game Consuls or a peer-to-peer network of at least two Video Game Consuls. Players create Characters that may interact with each other in a Video Game Environment that is stored on the Video Game Central Server and the Video Game Consuls.

Mission—a game parameter that a player character can complete to achieve game attributes Natural Resources—raw materials that can be removed from a territory Novice Player—Shall mean a player that is flagged as requiring the help of an expert to complete a Game Parameter.

NPC—(non player character) a computer generated character in the game

Parent—shall mean a player character that has completed a defined list of game parameters that allow that player character to designate another player character as a child. A parent/child relationship is established via a player to player contract that defines benefits for both parties.

Player—shall mean an individual who can register an account with a Video Game Central Server or within a peer-to-peer network and create Characters that can interact with other Characters in a Video Game Environment.

Player Account—Shall mean an account on the Video Game Central Server or within a peer-to-peer network that contains a Player profile including personal, billing, and character account information.

Player Attribute—shall mean any attribute that can be applied to a player account. Player Attributes shall include, but not be limited to:

Real Money
Discount of monthly fees for playing game
Monthly fee for playing a game
Global character attribute settings for all characters created by player across multiple games.
Rewards for encouraging another player to signup to play Player to Player Contract—shall mean a virtual but binding contract between player characters that allows the players to provide or exchange game attributes to one another. Once a player-to-player contract is established, the game server or peer-to-peer network automatically distributes acquired game attributes between the player characters based on the contract conditions.

Race—shall mean a certain type of character such as, but not limited to, humans, elves, dwarves, Halflings, undead, tauren, or orc.

Reincarnation—shall mean the ability of a player character to reinsert himself into his family tree as a child of any player characters in his family tree that are married.

Relationship—shall mean a link between two player characters that includes, but is not limited to: parent/child, marriage, boss/employee, slave/master, and army general/army soldier.

Saved Game Result—shall mean the storage of a completed game parameter in a file.

Soldier—shall mean a player character who has established a player to player contract with a general.

Synthetic Voice—shall mean the voice generated by converting a text file with a synthetic voice profile into a spoken word or phrase.

Team—Shall mean a group of player characters who have established player to player contracts with a coach.

Technology—a skill that a player character, family, city, or race can use to build new game attributes Territory—shall mean the virtual two or three dimensional space that is owned by a race or group of player characters in a game environment Text to Voice Software—shall mean software that can convert a text file with a synthetic voice profile into a spoken word or phrase.

Video Game—shall mean a game played on a Video Game Consul that may or may not be networked to a Video Game Central Server or within a peer-to-peer network.

Video Game Consul—shall mean a device comprising a CPU, memory and optional permanent storage residing at a player location that can allow for the playing of video games. Examples include, home PCs, Microsoft Xbox, and Sony Playstation.

Video Game Central Server—shall mean a CPU, memory (e.g., RAM) and permanent or temporary storage that is connected (e.g., via the Internet) to multiple Video Game Consuls, where the CPU is programmed (e.g., via software instructions) to execute a method that allows for Massive Multi Player Online Video Games to be played.

Video Game Environment—Shall mean a virtual video game world that is stored on the combination of the Video Game Central Server and Video Game Consuls where Characters interact and games are played.

Virtual Will—shall mean a virtual document that establishes which character attributes of a first player character shall be distributed to specific other player characters in the event of death of the first player character. Absent a Virtual Will, a Default Will shall prevail to determine attribute distribution to a character's heirs.

Voice Recognition Software—shall mean software that can convert a spoken voice into text and/or text into a spoken synthetic voice using a synthetic voice profile.

Voice to Text Software—shall mean software that can convert a spoken voice file into a text file.

Video games which are accessible to multiple players via a server are well known. For example, hundreds of thousands of players access games known as massive multi player online games (MMOGs). Players of these games customarily access a game repeatedly (for durations typically ranging from a few minutes to several days) over given period of time, which may be days, weeks, months or even years. The games are often constructed such that players pay a periodic subscription price (e.g., $15 per month) rather than, or in addition to, paying a one time purchase price for the game. Often, though not necessarily, these games have no ultimate "winner" or "winning goal," but instead attempt to create an enjoyable playing environment and a strong player community. The games are often designed such that advancement in the game is based on the benefits received from accumulated game play experience, so that beginning players have an initial disadvantage compared to more experienced players.

It would be advantageous to provide improved methods and apparatus for increasing the enjoyment and/or longevity of video games.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

According to one embodiment methods and systems are disclosed that allow player characters in a massive multi player online video game to create relationships with each other. Examples of the types of relationships that can be created are: 1. Marriage 2. Parent/Child 3. Slave/Master 4. Affair 5. Enchanter/Enchanted 6. Boss/Employee 7. Gods/Worshipers 8. Government Officials 9. Sports Teams/Coaches 10. Guilds 11. General/Army According to one embodiment, when a player character reaches a certain level in a video game, he is allowed the opportunity to have one or more of the above relationships with another player character. These relationships can be defined and/or limited by the player character's race and class in the game. Some of these relationships can allow the player character to develop additional relationships with subsequent player characters. These additional relationships may require the player character to reach another level in the game. Some levels of the game may be unobtainable by the player character unless they have developed certain relationships with other characters. Certain of these relationships may prevent or preclude certain other relationships with other player characters.

Relationships between player characters can provide additional benefits to one or more of the player characters in the relationship. Non-limiting examples of these benefits include: 1. A player character can receive some or all of the character attributes generated by another player character if they have a relationship (master/slave) 2. Player characters can have additional relationships with other player characters if they have a relationship with each other (marriage/children) 3. Attributes of a player character can be enhanced, modified, or transferred if they have a relationship with another character (children inherit attributes of parents) 4. The race or class of the player character can be altered as long as they have a relationship with another character (undead possess living player characters) 5. A player character can shorten, lengthen, or restart the life of another player character if they have a relationship (doctor/patient) 6. A player character cannot reach subsequent levels of a game or acquire certain character attributes unless they have one or more relationships with other characters. (mayor of city must have a wife and child)

Alternatively or additionally, relationships between characters can be limited based on character attributes including: 1. The race of the character 2. The class of the character 3. The number of player characters playing the game 4. The level of a player character 5. Whether or not a player character has a certain attribute or collection of attributes 6. Whether or not a player character has successfully completed a game parameter 7. How many hours the player plays with the player character in a given time period According to another embodiment, relationships between characters can be lost according to certain game parameters. Examples of the types of game parameters according to which a relationship might be lost include, but are not limited to: 1. One of the characters in the relationship has the authority to sever the relationship and does so. 2. One of the characters in the relationship cancels his account with the game server 3. One of the characters in the relationship does not log enough play time in a given time period 4. Both of the characters mutually request and agree to sever the relationship 5. Other characters establish a relationship with a character that severs their relationship with the first character 6. A certain time period of real time or game time has lapsed 7. One character pays or fails to pay or provide a certain amount or number of attributes to the other character, then their relationship may be severed.

According to one embodiment, relationships may be established in a variety of ways. Examples of ways in which relationships between characters can be established include, but are not limited to: 1. By a contract (e.g., an in game negotiated virtual contract) between two (or more) player characters or two (or more) players 2. Randomly or under proscribed rules controlled by the game server or within a peer-to-peer network 3. By a structure of rules defined by the game players, game server, or within a peer-to-peer network or a combination of these 4. When a new player character is created in the game, relationships are automatically established by the game server or within a peer-to-peer network between that character and the existing character's within the game.

According to one embodiment, each type of relationship may be defined and/or governed by various rules and/or limitations. Below are listed examples of relationships and governing rules and limitations for those relationships. It will be understood, however, that such relationships and limitations are provided only as examples of the types of relationships and limitations that could be used in a game and that none of the examples below should be construed as requirements for the embodiment. It will be further understood that rules and limitations may be added or deleted, individually or in groups, and that such rules and limitations may be static or fluid.

Marriage—Two players in a game reach a certain level of the game and are qualified to be married. The characters log in to a special screen of the game that displays other characters that are available to be married. Characters can display conditions for the marriage i.e. they need a certain dowry, prenuptials or will only marry a character of a certain class or level, or with sufficient resources, income or skills to contribute to the marriage. A player character can accept a marriage proposal or submit a counter offer. When both players agree to the terms of the marriage, then the system sets a flag in both of the character accounts indicating their newly formed relationship.

Different types of characters could have different marriage arrangements. For instance Taurens could be married to more than one other character, while Elves could only be married to one other character. Humans could get married at level 10 while elves could be married at level 15. Some races could have multiple marriages with fixed time limits.

Parent/Child—Once two players have been married; they can have children once one or both of them have reached a certain level of the game. Once one or both characters have reached a proscribed level of the game, their character accounts are flagged as being eligible to have children. A new player character formed by a new player can only come into the game when two other players are eligible to have a child and agree to have a child. A new player can specify what gender, race and class he wants his player character (child) to be. The system can display what gender, races and classes need or want more children by displaying the family trees of player characters already in the game that are married and that desire children. Parents can only have children within a certain subset of classes. For instance a rogue and a wizard can only have warriors and paladins as children, etc. Additional criteria can be set up by the new player or the parents to further establish the relationship between them. For instance, parents can set up a contract with the child so that they take a certain percentage of his experience or game attributes, but agree to leave all of their wealth to the child in their will when they die. New characters can set parameters for becoming a child, for instance, the new player child may agree to give his parent(s) a certain percentage of his future experience points, in exchange for certain attributes or other tangible or intangible property when his parent(s) acquire them. Once the parents and the child have agreed to a contract, the new player character is born into the game and is added to the family tree of the parents. The new child may then begin to play the game and strive to gain wealth and attributes, etc.

New player characters can only be added to the game environment by being offspring of other player characters. New players can elect to give a greater amount of their experience or game attributes to parents who are in a good family or who otherwise have desirable traits, attributes, wealth, etc. According to this example, so called "bad families" will have a cheaper "barrier to entry" for new players than "good families." A player can set up a profile of the type of character they want. When a married couple in the game is able to have a child, the new player character requests are analyzed and new children are created according to new player preferences. A new player can choose to have his player inserted into different ages based on different servers.

Some characters may be able to spawn children without marriages. For example, some races may not require the union of two characters in order for a parent to have a child. In these cases, children entering the game may suffer from deficits in income, attributes, or other characteristics. These deficits may plague the player throughout his life or only during childhood. An advantage of becoming a child out of wedlock is that there is no or little barrier to entry.

Slave/Master—A first player character may be captured by a second player character in the game. The first player character is made a slave to the second player character and some or all of his experience and attributes are given to his master until he is freed. A slave can be freed if a member of his family or the slave if a ransom is paid. The master can put out a ransom note, or he can keep it a secret that he has captured the first player character as a slave. Family members of the slave or the slave himself can log in to a special screen in the game to view the conditions of the ransom to free the slave/himself. If the family members or the slave agree to the conditions of the ransom, they can free the slave/himself. They can also free the slave by recapturing him in the game. All the slaves of a given race may be freed based upon the outcome of a war. If a General and his Army defeats another General's Army, the victorious General may choose to free all the slaves of the other race through an "emancipation proclamation." Slaves freed in this fashion will have all that was taken from them, plus optional penalties that are established by the Game Server or within a peer-to-peer network or as otherwise agreed upon by the players. Alternatively, Generals may agree to conditions of surrender, which may determine the disposition of any slaves or other spoils of war. In such case, slaves may be freed but they may receive only a portion or none of their previously lost wealth or other attributes.

Slaves may be subject to various penalties or governed by additional game rules while they are being held in slavery. Examples of the types of penalties or additional game rules to which a slave might be subjected include, but are not limited to: 1. Slaves can play in the game in a limited capacity until they are free. 2. Slaves can be cut off from communication with their family. 3. Slaves can commit suicide to start over in the game. (This could result in bad karma for the player character resulting in a low reentry status.) 4. Slaves can create their own contracts with other player characters who can free them from being slaves. 5. Slaves can bargain with their masters to free them for a proscribed initial or future, i.e., to be paid price. 6. A slave can also be sold by its master to another master by posting the slave for sale on a special marketplace.

Affair—In some instances, a married couple may not be able to produce offspring that compliment their team fighting abilities. For instance, a family may need more healers to have a well rounded fighting force, but none of the parents can have healers as children based on their classes. In this instance, a player character, once he reaches a certain level, can have an affair with a family member of another family so that they can have children of a specific class that they could not otherwise have. Children generated in this manner are members of both families. The stronger family has the right to absorb the bastard player into their family first. The concubine or weaker player character can negotiate a contract with the stronger player character in order to provide a bastard child to his family. In this manner, a family lacking in a certain class of character can go outside the family to generate those class types in their family, but must pay for the privilege by providing game attributes to the non family member who agrees to have the affair.

Incest. Absent all other options to bear children, close family members may have children. In such cases, the offspring shall be created in a manner similar to all other child bearing methods, except that, there shall be a greater probability of the offspring being defective in one or more ways. Such defects might include an inability to obtain certain attributes or use certain objects, weapons or tools. Another defect type might be a general constraint on the speed with which a child achieves various objectives, levels, karma, or other attributes. The degree to which these defects manifest themselves in such offspring may be determined randomly or predetermined by a set of rules enforced by the server or peer-to-peer network, Enchanter/Enchanted—Undead players can build up their army/family by enchanting other player characters. When an undead character reaches a certain level, they are eligible to enchant a "living" player character and cause them to be undead. These newly undead players than are removed from their current family tree and added to the undead family tree. To become living again, an undead player would have to be unenchanted by a device or spell provided by his family or by paying another Enchanter to provide the spell for a fee. Alternatively, once a player character has become undead, their family can only kill them and allow them to be reentered into their family further down the family tree via reincarnation.

If an undead character is killed, then the undead character that created him can be allowed to make another character undead. i.e. an undead character who has earned a credit to enchant a living character can reuse it if that living character that has become undead is killed.

Gods/Worshipers—Some characters, i.e. the first characters that sign on to a server, can be made Gods of their races. These gods can have some control of rules governing the entire game environment and can also bless or curse characters. Player characters can become blessed by offering attributes to the gods. They can nullify a curse by offering attributes to a god. Gods may be player characters or, in certain game versions, NPCs.

The goals of Gods are that their race rules the world. They can add extra incentives to parent/child contracts so that new player characters join their race over other alternative races.

Gods can battle one another and their strength is based on the strength of the families in their races.

Only a certain x number of characters can be gods in a given game environment.

Boss/Employee—in a mafia type game, new player characters can be introduced into a game as employees of a boss. Once player characters reach certain levels or acquire certain attributes in a game environment, they are eligible to take on new players as employees. Employees have to give a certain amount of the experience or game attributes they acquire to their boss in exchange for the position and/or protection. If either party fails to fulfill the terms of the contract, the contract can be nullified and his boss no longer employs the employee. The contract may include terms that control contract dissolution.

In a fantasy game such as World of Warcraft, player characters can be hired as soldiers to other player characters and fight for their army under an agreed upon contract. Characters log in to a special screen in the game to view employment contracts of other player characters.

Government Officials—Members of families who are strong qualify to be part of a race's government. Different races have different government structures. I.e. some governments require that all members of a race vote for someone to become a government official while others, the strongest players are automatically allowed into government positions.

For example, the human race can have a republic government with votes for party members. The Tauren race can have a monarchy and determine government position based on which player is the strongest.

Player's characters could also race to achieve certain levels in the game. The first person to reach a certain level in the game is allowed to be a government official over other characters in the game. A government official may be able to take an experience or attribute tax from other players. Player characters may challenge current government officials in future elections, which may occur at prescribed times/dates or when a majority of players in a given race agree to hold new elections.

Divorces—two player characters that are married can go to a virtual or player character judge who can split up their attributes if they want a divorce. Alternatively, if the married couple entered into a prenuptial agreement, that agreement shall govern the split up of their attributes upon entering into a divorce.

Sports Teams/Coaches—In a game that has teams or armies, a coach can recruit new player characters to be on his team based on how well his team is doing against other teams/armies. A coach can receive points for winning matches and, when a certain number of points have been obtained, he is entitled to recruit new player characters to be on his team/army. In this embodiment, player characters can be traded from one team to the next.

Examples of assets or value that might be used to trade player characters include, but are not limited to: 1. Other player characters 2. Game Points 3. Game Credits 4. Attributes According to this embodiment, there may be a virtual bench from which coaches can recruit if they are having a successful season. Alternatively, player characters could only be added to a team if other player characters could no longer play on a team due to injury or death.

Alternatively or additionally, as an option to help improve the overall competitiveness of a given team, the Game Server or peer-to-peer network may randomly, or based upon preset conditions, grant a coach the right to obtain one or more additional players with specific skill sets. As an example, if one team were to become so strong that they consistently dominate all other teams, the Game Server or peer-to-peer network may grant one or more of the underperforming teams the right to add sufficient additional players with appropriate skills and experience so as to make them better able to compete against the dominate team.

Guilds—A player character in charge of a guild cannot add other player characters unless either he or his guild have obtained a certain level in the game, completed certain game parameters, or acquired enough game attributes to qualify to add characters to the guild. New player characters coming into the guild can do so with a contract that can be negotiated before they join the game environment. Players in a guild can renegotiate contracts with their guild, or can be recruited to other guilds who offer competitive contracts.

General/Soldier—A player character who is a general can recruit new player characters into his army when he successfully defeats another army in combat. New player characters entering the game environment can elect to join an army based on available slots and offers in contracts. A weaker army would have to give more to new recruits in order to have them join. A contract to join an army could include: 1. A rank or position in the army 2. A salary 3. A % of spoils obtained by the army 4. One or more attributes (swords, etc)

Alternatively, or additionally, to help ensure competitiveness among armies, the Game Server or peer-to-peer network may randomly or via proscribed rules, grant rights to underperforming teams to obtain new soldiers for free or for reduced fees.

According to yet another embodiment, the game rules may specify that a player character cannot enter the game environment unless a relationship is established between one or more player characters already in the game environment and himself. For example, the game rules may state that a player character has to enter the game as a child of two other player characters.

As a further embodiment, when two player characters are eligible to have offspring, the system can randomly insert twins a certain x number of times in the game. A twin may be another player character or an NPC.

Accordingly, contracts between player characters may be formed in a wide variety of ways including, for example and without limitations, by the game server, within a peer-to-peer network, or by player characters via a trade or exchange service.

According to one embodiment, a player character can view his family tree at any time during game play by logging in to a special family tree page.

According to another embodiment, a player character can be a god in the game and determine rules and settings that other player characters abide by. Accordingly, certain players, e.g. those with the oldest game accounts may be able to reach or achieve a god level that presides over other game players and manages player and game mechanics such as population growth. Thus, a god level player may, for example, have choices as to how new offspring are born into the game.

According to another embodiment, certain attributes, classes, and special powers may only be available to player characters that have certain characteristics or attributes such as, for example and without limitations, players with a certain number of ancestors or who have been reincarnated a certain number of times.

Sexes and classes can be selected by any desired means, including, for example, by the character or randomly by the system.

According to one embodiment, characters may be generated as children based on "genetically crossbreeding" the parents. According to one method of this embodiment, lists of player attributes for both parents are generated and random or average selections from both parents are compiled to form the child. Each attribute of the parent can be specified by the game server as dominant or recessive. The child created by the union receives one chromosome from each player character parent. Depending on which attributes are considered dominant and recessive, when the child is generated by the chromosomes of his parents, his attributes are determined. This embodiment also allows for mutations from one generation to the next. Mutations can randomly occur and provide new or enhanced attributes to the offspring of the children.

According to an embodiment, when one or more player characters have the right or ability to create a child character, or when one or more player characters form a relationship, one or more profiles can be generated based at least in part on the attributes of those player characters. The generated profiles can be made available to players, such as to players who desire to acquire a new character (e.g., new players entering into the game).

In an embodiment, generated profiles can be made visible, in whole or in part, to other players, e.g., to players acquiring or desiring to acquire a new character. The profiles may include information of interest, e.g., the one or more parents from which the profile was generated, attributes of the parents, the relative success of the parents in game play.

In an embodiment, players may select from among one or more generated profiles to create their character. Similarly, players may select from among one or more sets of parents or potential parent characters to create their character.

In an embodiment, some or all skills, items, or other features of a video game are only made available to a character with a predetermined relationship, such as a child relationship to a parent character (e.g., a parent possessing that skill, item, or other feature).

In an embodiment, some or all skills, items, or other features of a video game are limited to a certain number of player characters, and may only be inherited based on a child relationship.

In an embodiment, a game has a finite set of character attribute classes that are distributed to a predetermined number of the first players of the game. Then, only offspring of those characters can have those attributes.

In an embodiment, one or more players can elect to cooperate to generate a profile based at least in part on the attributes of those player characters. For example, a spell or portion can be created that allows two player characters to create a profile that is randomly created from their respective attributes. If the profile is deficient, undesirable or insufficient in some manner, the profile can be discarded rather than made available to a player.

In an embodiment, a player character that does not establish enough parent child contracts with other players dies or is otherwise penalized. When a player character dies or is otherwise penalized, the unique attributes of his character can be made available to other players so that the can be disseminated amongst the population. When a player character dies, new players can come into the game with some or all of the unique attributes without being the child of an existing character. Alternatively, the unique attributes of the dead character are not made available to other players.

Certain toys or other in game or out of game attributes can only be available to characters and players in certain family trees or to those who achieve certain levels, obtain certain attributes, or acquire required virtual objects, which may be exchanged for tangible goods and services.

According to one embodiment, player characters could only be allowed to be inserted in the game with particular characteristics, for example, as a particular race (e.g., goblin) of the game.

Populations may be managed so that no race in a game environment dominates all other races or grows faster than other races. With this limitation enabled, even if player characters reach the required level in the game where they qualify to have a child, they may not be able to have a child if their race has a population substantially or unfairly greater than other races in the game. In this manner, the game server or peer-to-peer network can manage the number of player characters in each race, and even in each class of each race. Alternatively, player characters that are citizens of a particular city in a game may only have children when both (i) they qualify and (ii) the city is large/healthy enough to support additional player character populations.

According to another embodiment, all, an average, or a portion of the attributes of parents can be passed on to their children. For example, a parent with an intelligence level of 12 can pass on 50% of his intelligence level to his child. As player characters age, attributes such as intelligence increase, so an older player character can pass on greater attribute levels than a younger player character.

According to another embodiment, in some ages and races, a player character can be too old to establish a relationship with another player character, even if his level allows it. For example, age can be based on the hours of game play, and/or on some other features.

According to another embodiment, under certain game conditions, different races or classes of characters can have a child together, the offspring of which forms a new race. For example, in the third era of a game, elves and humans can mate to form Halflings.

According to yet another embodiment, players could pay an extra fee for an account that allows their player characters to have certain relationships with other player characters.

According to another embodiment, the entire group of characters that have a relationship (i.e. family or army) may have to reach certain cumulative experience or game level in order to add new characters to the group. Alternatively, a certain number of characters in the group may have to have a certain amount of experience or have obtained a certain level in the game before they, or other members of the group can have relationships with new or existing player characters.

Accordingly, the present disclosure provides for hardware and software that can be utilized to create one or more, or a combination of, any of the above-described embodiments. Non-limiting examples of software programs that might be used for the realization of the above embodiments include, but are not limited to:

Game Environment Program
Billing Program
Character Relationship Program
Character Profile and Management Program Examples of databases that might be used for the realization of the above embodiments include, but are not limited to:

Player Database including, for example: Player GUID Player Billing Info Player Characters 1-N Account Type Player Character Database including, for example: Player GUID Character GUID Character Attributes 1-n Character Skills 1-n with Current Level 1-n Character Relationship(s) 1-n (tree) Relationship Type(s) 1-n Relationship Type Database including, for example: Relationship Type ID Relationship Type Name Relationship Type Conditions/Restrictions 1-n Relationship Contract Database including, for example: Relationship Contract ID Relationship Character 1-n (tree) Relationship Conditions 1-n Player Character Family Tree Database including, for example: Player Character ID Player Character Relationship 1-n (tree).

The present disclosure further provides methods by which the embodiments described above, alone or in combination, may be realized. Examples of methods that may be employed include, but are not limited to:

A method to determine eligibility to form a relationship comprising: retrieving Player Character attributes 1-n, determining if attributes qualify for a relationship, and If attributes qualify for a relationship, flagging the character account as eligible for a relationship; and outputting the relationship availability to the player character.

A method to create a contract to establish relationship comprising: retrieving a request to form a relationship contract, outputting the relationship contract parameters, receiving relationship contract conditions; and creating new relationship contract record.

A method to form a relationship comprising: retrieving a request to view relationship contracts, determining relationship contracts availability based on player character account and relationship contract conditions, outputting available relationship contracts, receiving an indication of acceptance of a relationship contract or a counter offer, creating a relationship based on agreed upon contract conditions; and updating the relationship contract record.

A method for a character to sever a relationship comprising: receiving a request to sever a relationship contract, determine if the request is permitted based upon relationship contract conditions, and if the request is permitted, severing the relationship, and if the request is not permitted, outputting additional conditions that must be met in order for relationship to be severed; and updating the relationship contract record.

A method for a server to sever a relationship comprising: retrieving a relationship contract, determine if the contract is eligible to be severed, outputting the offer to sever contract to player characters, and if offer is accepted, severing the contract and updating relationship contract record.

A method for creating a child character based on attributes of parent characters comprising: determining that a child relationship contract is available for two player characters, receiving an indication that a player character desires to be a child of two player characters, generating a genetic profile of the child player character based in part on the genetic profile of the parent player characters, and creating a child player character with genetic profile.

A method to create a new player character related to existing player characters comprises: determining that a child relationship is available for one or more player characters, receiving (or generating) child relationship contract conditions, creating a child relationship contract, receiving a new player character request, outputting available child relationship contracts, receiving an acceptance of the child relationship contract, and creating a new player character that is a child of one or more existing player characters.

A method to allow a player character to receive game attributes for completing a game parameter only if relationship with other player character exists comprising: receiving an indication that a game parameter has been completed by a player character, determining if the player character has a relationship with another player character, and if a relationship exists, releasing available game attributes for successful completion of game parameter.

A method to allow player character to attempt to complete a game parameter only if relationship with other player character exists comprising: receiving a request to attempt to complete a game parameter, determining if the player character has a relationship with another player character, outputting a "game parameter requires relationship message" if character does not have a relationship with another player character; and initiating game parameter if player character has a relationship with another player character.

Of course it will be appreciated that such methods are provided for the purposes of example only and that none of the above methods should be interpreted as necessarily requiring any of the included steps nor should they be interpreted as necessarily excluding any additional steps.

According to yet another embodiment, the present disclosure provides methods and systems to allow for karma points, death and reincarnation of player characters in a video game, such as, for example, a massive multiplayer online video game.

According to one embodiment, a fixed time limit is placed on the amount of virtual or actual time a player character can exist in a game environment. During their lifespan, player characters can acquire "Karma" points based on their activity in the game. A player's life span can be set to expire within a range of ages that may be based on factors including, but not limited to, the player character's race, the character's class, a random number, and/or, the player's karma points from a previous life.

According to one embodiment, the player character can extend or shorten his life by, for example and without limitations, getting killed a certain x times before they die, getting killed a certain x times by a certain method before they die, using game attributes, such as portions and armor (i.e. using the picture of Dorian Gray), purchasing or stealing life credits from another player character (i.e. buying medicine from a doctor or drinking the blood from slaves), earning karma points, and/or completing game parameters (i.e. finding the fountain of youth).

According to another embodiment, at the end of his life, a player character can establish a will that allows other player characters to receive the game attributes he has acquired over his lifespan. The will may, but is not necessarily, limited to leaving game attributes to the player character's relatives. A will can be created, for example, by the player character, by the heirs of the player character, by the game server based on rules, or randomly.

As yet another alternative or in addition to the previously described division of assets, the Game Server or Peer-to-peer network may randomly or predictably decide to distribute a portion or all of an estate to a player's race, and/or allocate a portion of the estate to "taxes" in which case the taxed portion of the estate is forever lost to the deceased's progeny.

According to another embodiment, over the course of a lifespan in the game, a player character earns positive or negative karma points that are used when the player character is reinserted into the game after his death. Positive Karma points can be earned, for example and with limitation, by: completing game parameters, killing other player characters, assisting other player characters to obtain attributes or complete game parameters, and/or having relationships with other player characters, including assisting other characters. Negative Karma points can be gained, for example and without limitations, by: failing to fulfill contracts, killing one's own offspring, having a spell cast against the player, being killed, and/or having affairs or children out of wedlock.

According to another embodiment, when a player dies, the character may become a ghost. A ghost may play in the game environment, but may have limited character attributes and/or properties. These limited properties might include: 1. The ability to chat with other player characters or provide hints 2. The ability to curse items, player characters, or places in the game 3. The ability to inhibit or otherwise influence the movement of certain player characters 4. While a character is in ghost status, he can earn positive or negative karma points by helping or hurting other player characters.

The ability to possess other player characters—in this embodiment, when a player character becomes a ghost he may be able to insert his will into the body of another player character. This may be a way to create undead characters in the game. The ability to possess people may be limited to player characters of a certain rank, race, class, or other measurable attribute of the game. For instance, a player character with a great number of negative Karma points may be able to indefinitely possess another player character. Alternatively, a player character that has become a ghost may only be able to possess another player character if they have a high number of negative karma points, or some other acquired attribute of the game, but then only for a limited amount of time proportionate with the number of negative karma points they have acquired.

Alternatively, a player character may only possess another player character when the first player character has become a ghost and the second player character has become enchanted by an undead player in the game.

According to another embodiment, a player with a ghost character can develop a new player contract that allows him to be reinserted in to the game as a child of one or more of the members of his family. Once two player characters are able to have children, the player character can be removed from the game as a ghost and reinserted as a new player character that is the child of the other two player characters.

According to another embodiment, when a player character is reinserted in the game, his Karma points may be used to establish a variety of factors including, without limitation: 1. The character attributes he begins with in the game (e.g. a player character with good karma could start the game with a really good weapon). 2. His new player character lifespan (i.e. a player character with good karma could be given an extended lifespan). 3. What family he is allowed to be inserted in (e.g. a player with good karma could have the option to be reinserted as a child in a high ranking family in the game). 4. What other player characters are allowed to be his parents. 5. What race, class or other character type he is allowed to be in the game. 6. Whether or not he is allowed to be reinserted in the game. 7. His starting level in the game (i.e. a character with good Karma can start at level 10). 8. What level of karma he begins with (i.e., some portion of karma may be passed on to the reincarnated player). 9. How many or how quickly the player may create new offspring.

According to yet another embodiment, a player character that has no Karma that wants to play the game may be subject to certain restrictions or limitations. For example a player character with no Karma may be restricted to starting as a certain class of player character, e.g., a player with no karma needs to start as an Orc or Tauren and earn karma points by playing with a character that then dies. The karma points earned by the character could then allow the player to create a new character that is of a different class than the first. i.e. once the first character earned sufficient karma points, the second character developed by the player character could be in the human race rather than the Tauren race. Bad karma points could allow the player to insert a new character only in races that are classified as evil. I.e. a new player character established by a player whose previous player character had bad karma could only be in the orc, Tauren, or undead race.

Alternatively or additionally, only certain classes may be available to a new player character based on his karma points. For instance, a new player character with no karma points could only be inserted into the game as a beggar or slave. Once he has earned karma points with that player character, and that player character dies, the new character of the player can have more class choices available to him. i.e. the new player character could be a warrior, slave, beggar, or paladin because of the karma points he earned in a previous life in the game.

According to one embodiment, players could pay an extra fee to the server or to other player characters for their characters to be able to earn karma points in a game.

According to another embodiment, being reincarnated in a game allows the player character to enter at a higher level, or as a different class. I.e., the number of times a player character has been reincarnated may effect the starting level and/or available class choices for that character. This may or may not be further regulated based upon the amount of positive or negative karma accumulated by the player character in previous lives.

According to another embodiment, a player character can assign attributes in his will to other player characters whether or not they have relationship contracts established.

According to another embodiment, a player character receiving a game attribute via an inheritance from another player character may have to fulfill certain conditions before he can acquire the attribute. For instance, the player character may have to reach a certain level, complete a certain game parameter, or acquire a certain game attribute or object in order for a game attribute that he has inherited to be released from escrow of the estate of the deceased player character.

According to another embodiment, rather than Karma being measured in points, it can be measured in game attributes or currency or any combination of these variables.

Accordingly, the present disclosure provides for hardware and software that can be utilized to create one or more, or a combination of, any of the above-described embodiments. Non-limiting examples of software programs that might be used for the realization of the above embodiments include, but are not limited to:
  Game Program
  Character Insertion Program
  Will Creation, Notification and Enforcement Program
  Character Death Program
  Character Reincarnation Program Examples of databases that might be used for the realization of the above embodiments include, but are not limited to:
  Player Database including, for example, player GUID, Player Billing Info, Player Account Type, and/or Character GUID 1-n
  Character Database including, for example, Character GUID, Character Relationships 1-n (tree), Character birth date, Character death date, Character will ID, Character Karma Points, and/or Character Attributes 1-n
  Inheritor Database including, for example, Inheritor GUID, Relationships 1-n (tree), Will Database, Will GUID, Character GUID, Attributes 1-n, Attribute Inheritor assignment 1-n, and/or Will conditions 1-n.
  Attribute Database including, for example, Attribute ID, and/or Character GUID,
  Karma Database including, for example, Karma Attribute ID, Karma point requirement 1-n, and/or Character GUID 1-n.

The present disclosure further provides methods by which the embodiments described above, alone or in combination, may be realized. Examples of methods that may be employed include, but are not limited to:

A method wherein a character dies comprising: Receiving an indication that character has reached lifespan time limit, Outputting indication that character is deceased, Updating character database, Determining if player character qualifies to be a ghost, and If character qualifies to be a ghost, flag player character account as ghost and if player character does not qualify to be a ghost, cancel player character account.

A method where a character is reincarnated based on karma comprising: Receiving an indication that player character is deceased Retrieving player character karma points Determining if player character qualifies for reincarnation; and If player character qualifies, retrieving reincarnation conditions Determining if player character or new relationship contract fulfills conditions Creating new player character from deceased player character if conditions are met. Determining initial character attributes based on karma and reincarnation rules Endowing new player character with character attributes based on karma Establishing new player character starting karma points; and Updating new player character database A method in which a character becomes ghost and possesses another character comprising: Receiving an indication that character has deceased; Determining if player character qualifies to be a ghost; and If player character qualifies to be a ghost, flag player character account as ghost Receive indication that ghost desires to possess another player character Determine if conditions are satisfied to allow ghost to posses other player character; and if conditions are met; Allow ghost to possess other player character; Notify possessed player; and update possessed player's database as being possessed.

A method to create a will in a game comprising: Receiving a request to create a will; Identifying player characters that are established as inheritors Receiving and storing conditions of inheritance for each qualifying game attribute Linking each qualifying attribute to one or more inheritors; and Updating will database.

A method to create a default will in a video game comprising: Receiving an indication that character has deceased; determine if player character has established a will; and if player character has not established a will: creating a default will that equally divides the deceased's estate among his heirs; or, dividing the estate based upon a ratio that favors those heirs that are closest in relation to the deceased family tree. optionally taxing the estate; and Updating Will Database A method to establish a Will comprising: Receiving an indication that character has died Determining if the character has qualifying game attributes that are not linked to an inheritor; Outputting a list of attributes that are not linked to an inheritor Receiving an inheritor for each qualifying game attribute. Receiving conditions of inheritance for each qualifying game attribute; and Placing items in escrow A method for receiving game attributes from a will comprising: Placing inherited item in escrow Outputting notice of game attribute in escrow to each inheritor including conditions Receiving an indication that conditions are complete Receive request to remove game attribute from escrow Determine if conditions have been fulfilled, and Release game attribute to inheritor.

Of course it will be appreciated that such methods are provided for the purposes of example only and that none of the above methods should be interpreted as necessarily requiring any of the included steps nor should they be interpreted as necessarily excluding any additional steps.

According to yet another embodiment, the present disclosure provides a method and system to allow for inheritance between player characters in a video game such as a MMPOV.

According to this embodiment, when a player character dies (see, e.g. above), he is able to have some or all of the attributes he acquires in the game be given to other player characters in the game. Before his death, the player character can establish a will that specifies which assets/attributes go to which other player characters.

At any time during game play, a player can assign his attributes to other player characters when he dies in the form of a virtual will. The conditions under which a player can assign attributes to other player characters may be subject to limitations. Non-limiting examples of the types of limitations that may exist include:

That the other player characters are in the same family as the player character

That the other player characters are in the same race as the player character

That the other player characters are in the same class as the player character

That every member of his family, based on position in the family tree, gets the same or relative percentage of the attributes available as other family characters.

That other player characters have the appropriate karma or other rating before they receive the attributes assigned to them in a will.

That other player characters do not have a lean or debt to a third player character, who can automatically receive the player character inheritance to offset the debt owed them. In this embodiment, the system can automatically use attributes to offset debts, or a player character can use attributes he has inherited to offset debts without the system intervention.

In an alternate embodiment, the system may determine a tax amount to charge to the player character account before the player character's attributes are given to his heirs. The system may determine a virtual equivalent cash value for each attribute that the player character owns that can also be assigned to another player character. The attributes may be assigned to player characters. When the first player character dies, the second player character may be notified that he is eligible to receive an attribute from the first player character. If the attribute is cash, the system may automatically remove the tax fee and distribute the cash to the player (assuming the inheritor meets all other inheritance criteria and there are no other offsets, taxes, or precedent liens or debts). If the attribute is an object, the system may determine a virtual cash value for the item and notify the player character who has inherited it that he must pay the tax portion of the cash value in order to collect and use the item. After settling all debts, liens or other encumbrances that take precedence over the player character's right to inherit the assets, the player character may elect either (i) to pay the tax due on the item or (ii) sell the item and collect the selling price less the tax percentage.

According to one embodiment, taxes can be assigned and collected by the system, or by a government that is comprised of and managed by player characters. The virtual money stored by the government of player characters can be used by them to improve shared attributes in the game environment or used to finance a war.

In another embodiment other player characters can contest a will and it can be distributed based on a group vote by a group of family members, a government official, a god, an individual family member, or other player character or group of player characters in the game. Such distribution determination may alternatively be governed by chance outcomes.

According to another embodiment, players could pay an extra fee to the server so to help assure that their character can inherit attributes from their parents.

According to another embodiment, when a character is possessed, his game attributes could be distributed to his family based on his will, held by the game server, remain with the character or transfer over to his undead family.

In another embodiment, if no will is established, all attributes may be auctioned off and the attributes sent to the government of which the player character was a member.

In another embodiment, if no will is established, a default will may be created under which assets are divided among surviving family members. Assets may be distributed using any desired means. For example, assets may be divided using a percentage based upon closeness of the heir to the deceased's family tree. Distribution under a default will, may or may not adhere to the other distribution constraints outlined above.

In another embodiment, if no will is established, the assets of the deceased may be distributed by chance or lottery. In such case, any other player, regardless of class, status or other attributes, may inherit some or all of such assets.

In another embodiment, a potential heir may encumber their share of future, not yet distributed, attributes. This may be in the form of a loan from a third party player.

In another embodiment, the character may assign certain attributes to himself once he has re-entered the game as the reincarnated child of his own offspring.

According to another embodiment, items that are sold that are also linked to an inheritor in a will be immediately removed from the will contract.

Accordingly, the present disclosure provides for hardware and software that can be utilized to create one or more, or a combination of, any of the above-described embodiments. Non-limiting examples of software programs that might be used for the realization of the above embodiments include, but are not limited to:

Game Program

Will Creation, Notification and Enforcement Program

Attribute Distribution Program

Tax determination program

Examples of databases that might be used for the realization of the above embodiments include, but are not limited to:

Player Database including, for example, 1. Player GUID, 2. Player Billing Info 3. Player Account Type 4. Player Characters 1-n Character Database including, for example, 1. Character GUID 2. Character Attribute IDs 3 Character Will ID Attribute Database including, for example, 1. Attribute ID 2. Attribute Type 3. Attribute Descriptor 4. Attribute Value Will Database including, for example, 1. Inheritor GUID 2. Inheritor Attribute 1-n 3. Attribute Condition 1-n Tax Database including, for example, 1. Global Tax Rate 2. Race Tax Rate 3. Family Tax Rate 4. Class Tax Rate 5. Attribute Type Tax Rate 6. Character Tax Rate 7. Tax Rate rules 1-n 8. Tax Rate Conditions 1-n The present disclosure further provides methods by which the embodiments described above, alone or in combination, may be realized. Examples of methods that may be employed include, but are not limited to:

A method of forming a will comprising: Receive request to form a will from a player character Retrieve player character attributes Receive link of each attribute to one or more inheritors Save will A method to create a default will comprising: Receive indication that character has deceased Determine if player character has established a will If player character has not established a will: create a default will that equally divides the deceased's estate among his heirs, or, alternatively, divide the estate based upon a ratio that favors those heirs that are closest in relation to the deceased family tree Update Will Database A method to distribute attributes to heirs comprising: Receive indication that a player character has died Generate list of inheritors (from a will or default will) Distribute player character attributes to inheritors based on player character and/or game server rules and conditions Update player (i.e., heir) attribute database A method of taxing will assets before distribution comprising: Receive game attributes flagged for inheritors Determine tax rules and conditions Determine taxes due based on rules and conditions Withhold taxes or place character attributes in escrow with tax payment conditions A method to inform inheritors that tax fee is due comprising: Determine taxes due for a game attribute Retrieve inheritor of item Notify inheritor of the taxes due A method to pay taxes and debts and retrieve item from escrow comprising: Receive request to retrieve game attribute from escrow Receive tax payment for game item Distribute remaining items to any third party owed by heir Release remaining game attribute(s) to player character Update player (i.e., heir) attribute database A method to liquidate game assets to pay off/down debts or other encumbrances comprising: Receive indication that player character has died Determine debts Determine values of game attributes of player character Liquidate game attributes up to debt amount Pay down/off debts of player character Determine if additional game attributes remain Distribute remaining attributes to inheritors based on will.

Of course it will be appreciated that such methods are provided for the purposes of example only and that none of the above methods should be interpreted as necessarily requiring any of the included steps nor should they be interpreted as necessarily excluding any additional steps.

According to another embodiment, the present disclosure provides a Massive Multi Player Online Video Game that progresses in eras. According to this embodiment a game environment that progresses in discrete time frames, i.e., "ages" or "eras" is provided. At its inception, the game environment may begin with a certain structure that may include: 1. a virtual geography 2. a virtual map of the geography 3. a group of game parameters that can be completed by player characters 4. a maximum population of player characters 5. a list of available resources or game attributes 6. a max group of resources or game attributes 7. a group of available player races 8. a group of available player classes 9. a group of available player attributes 10. a maximum size of a player character family tree 11. The types of skills a player character can acquire and or develop 12. A group of available technologies According to one embodiment, as the game progresses through time it may be altered in a number of ways, including without limitation, in the following ways: 1. The virtual geography may become larger or smaller 2. The map of the virtual geography may become larger, smaller or more or less defined 3. The group or number of game parameters may be changed, expanded, or reduced 4. The list or number of game resources and or attributes may be expanded, reduced, or altered 5. The maximum group or number of resources or game attributes may be expanded, reduced or altered 6. The list of available player races may be expanded, reduced or altered 7. a list of available player classes may be expanded, reduced or altered 8. a list of available player attributes may be expanded, reduced or altered 9. a maximum size of a player character family tree may be expanded, reduced or altered 10. The types of skills a player character can acquire and or develop may be expanded, reduced or altered According to one embodiment, new alterations of the game environment can occur only when one or more events occurs. Examples of the types of events that might allow alterations of the game environment to take place include, without limitation: 1. a certain amount of virtual or actual time elapses 2. one or more player characters complete a game parameter 3. the game environment reaches is max population setting 4. An available attribute or resource is discovered or depleted 5. a certain section of the game geography is discovered, explored, or developed 6. a certain number of relationships has been established or dissolved between player characters 7. a certain number of play cycles are completed 8. a war between races is won or lost 9. a certain number of players have entered or left the game According to one embodiment, player characters can build, find, and use time travel devices that allow them to move from the present state of the server to the past. Player characters can observe the past without altering the past. Time travel devices essentially serve as history books of a game environment.

Additionally or alternatively, by paying a fee or by acquiring a skill or through use of an acquired portion, players can travel back in time to replay a segment of the game to improve the outcome or to gain additional experience. Such replay episodes are restricted to solitary game play, such as completing a task, solving a puzzle, etc., i.e., replays that require multiple players are precluded. Players may improve their condition in the present through such time travel episodes.

According to one embodiment, different servers of the same game can be set or, optionally reset, to be on different eras of the game at the same time. A new player can elect to insert his character into any era of the game at any time.

According to one embodiment, if a certain attribute is not acquired by a player or group of players before an era of the game has elapsed, than that player or group of players can never obtain that attribute. There may be exceptions to this rule. For example, such as when a player or group of players travels back in time and successfully completes the task or acquires the attribute.

According to one embodiment, certain items and character mutations may only be available in certain epochs or eras of the game.

According to one embodiment, a game that moves in Eras ends with an apocalypse.

According to one embodiment, an apocalypse may be triggered by the occurrence of one or more events. For example, an apocalypse may be triggered if one or more of the following occurs: 1. a certain number of a certain race, class, guild, or family exists in the game environment 2. a certain age is reached in the game environment 3. one or more player characters acquires a certain game attribute 4. The Game Server starts an apocalypse or within a peer-to-peer network, this may be a random event or it may be initiated when the system determines that a game is stagnant or uninteresting.

According to one embodiment, an apocalypse allows one or more player characters of a player race, class, guild, or family to become a savior.

According to one embodiment, a savior can lead his army, which consists of other player characters of his race, class, guild, or family to total victory. Total victory may be defined as the domination of the game environment. When total victory is obtained, the game environment may be reset. The saviors may then become the founding members of the reset or new game environment.

According to one embodiment, a player character can become a savior by: 1. Acquiring a certain game attribute 2. Being reincarnated a certain number of times in the game 3. Being a certain x number in his family tree, guild, class, or race 4. Being sacrificed by his family, guild, class or race A. each family, guild, class or race can sacrifice a player character so that player character can become eligible to become a savior B. a certain class, race, or family member must exist to perform the sacrifice ritual. C. the sacrifice ritual can be: 1. Casting a spell on a player character 2. Killing a player character with a certain weapon 3. Applying a character attribute to a player character 2. Being randomly created by the server or network 3. Being endowed by a God with sufficient attributes or karma According to one embodiment, saviors can create special player characters as family members to wage the war of the apocalypse According to one embodiment, the goal of the apocalypse era is to kill the savior and army of other race, class, guilds, or families first.

According to one embodiment, the last savior standing wins the game for his class, guild, race, or family.

According to one embodiment, when the age of the apocalypse occurs in the game environment, all player characters are notified.

According to one embodiment, progress and strengths of families, classes, races, or guilds; including whether or not that group of player characters includes a savior, can be displayed to all player characters in the game.

According to one embodiment, undead saviors can be treated as Satan and their minions as demons.

According to one embodiment, living saviors can be treated as Christ and their minions are angels.

According to one embodiment, a player can pay an additional fee (real or imaginary) for his characters to have the ability to become saviors.

According to one embodiment, a player character may take part in a sacrificial ceremony in order to create a savior. Examples of sacrificial ceremonies include: 1. An orc priest tears the heart of the head of his family out of his chest and plants it into a clay statue. The statue becomes the savior 2. an undead wizard casts a spell on the head of his family, who is devoured by maggots, the maggots grow into flies that recombine into one or more saviors 3. A dwarf engineer plants a cyborg brain into the head of his family. The brain controls the body of the player character and he becomes the savior 4. A group of human druids burn the head of their family at the stake. The ashes are placed into an urn and the savior rises from the ashes. 5. The youngest or eldest family member or a virgin female family member is drawn and quartered on scared grounds and then the body parts are cooked on a holy alter and subsequently devoured by the surviving family members.

According to one embodiment, the children of the human savior are born with wings and can fly.

According to one embodiment, certain classes can have a randomly placed super player characters created during each game era. Player characters that are super player characters have special attributes and skills (super scientist, artist, engineer, warrior, etc) essentially they are mutations that can discover a new innovation that can be traded with other families, races, or classes. Families that are more powerful have greater odds of creating super player characters.

According to one embodiment, families or guilds can discover technologies that can be traded with other families and guilds. Technologies are discovered when certain player characters reach certain levels of skill or acquire certain game attributes Accordingly, the present disclosure provides for hardware and software that can be utilized to create one or more, or a combination of, any of the above-described embodiments. Non-limiting examples of software programs that might be used for the realization of the above embodiments include, but are not limited to:
Game Program
Era Update Program
Savior Creation Program
Apocalypse Program
Reset Game Program Examples of databases that might be used for the realization of the above embodiments include, but are not limited to:
Player Database, including, for example, 1. Player GUID 2. Player Billing Info 3. Player Account Settings 4. Character GUIDs 1-n Character Database including, for example, 5. Character GUID 6. Savior Qualifications 1-n 7. Savior Attributes 1-n Era Database including, for example, 1. Era ID 2. Era Descriptor 3. Era Conditions 1-n 4. Era Time Start 5. Era Time End 6. Era Populations 1-n 7. Era Classes 1-n 8. Era Races 1-n 9. Era Technologies 1-n 10. Era Natural Resources 1-n 11. Era Skills 1-n 12. Era Rules 1-n 13. Era limits 1-n 14. Era territories 1-n 15. Available Game Parameters 1-n 16. Available Game attributes 1-n 17. Family conditions 1-n Historical Archive including, for example, 8. Saved Game Result ID 9. Game area 10. Game time 11. Player characters involved 12. Saved game result file Sacrifice Rules Database including, for example, 13. Sacrifice Rule ID 14. Sacrifice Rules 1-n 15. Probability of Sacrifice Success The present disclosure further provides methods by which the embodiments described above, alone or in combination, may be realized. Examples of methods that may be employed include, but are not limited to:

A method for creating a new game environment comprising: Receive request to create new game environment Retrieve new era rules and conditions Apply rules and conditions to game environment to create new game.

A method to alter a game environment when a new era occurs comprising: Receive indication that era condition or rule has been fulfilled Retrieve new era conditions and rules Apply new era conditions to game environment Create new era A method to facilitate time travel comprising: Receive request to conduct time travel from a player character Receive time travel conditions Determine if player character qualifies for time travel If player character qualifies for time travel, retrieve saved game result based on time travel conditions Output saved game result to player character A method to facilitate time travel game play comprising: Complete Time Travel request Temporarily reset game space conditions to the time and place as requested Permit player to replay within discreet time and place conditions Receive new outcome Update historical records up to and including present records as if event actually occurred Output saved game result to player character Update player character attributes A method to sacrifice a player character to create a savior character comprising: Receive request to sacrifice player character Determine if sacrifice conditions are met Determine if player character qualifies to be sacrificed Sacrifice player character Randomly determine if sacrifice has succeeded If sacrifice is successful, create savior from sacrificed player A method to create savior character(s) comprising: Receive indication that Era qualifies for savior Identify player characters that qualify to be saviors Determine if qualifying players have fulfilled savior conditions Flag player character accounts as saviors if they have fulfilled savior conditions A method to reset game parameter to first era comprising: Receive indication that apocalypse has occurred Reset game parameter to first era Populate game environment with player characters based on apocalypse results and apocalypse rules and conditions A method to randomly reset game parameter to first era comprising: Receive random indication that apocalypse has occurred Reset game parameter to first era Populate game environment with player characters based on apocalypse results and apocalypse rules and conditions A method for creating a system generated apocalypse comprising: Receive indication that apocalypse should be artificially generated due to stagnant game conditions Cause apocalypse Reset game parameter to first era Populate game environment with player characters based on apocalypse results and apocalypse rules and conditions Of course it will be appreciated that such methods are provided for the purposes of example only and that none of the above methods should be interpreted as necessarily requiring any of the included steps nor should they be interpreted as necessarily excluding any additional steps.

According to yet another embodiment, the present disclosure provides an in-game attribute that allows reverse outcomes of game parameters in video games such as a Massive Multi Player Online Video Game.

According to this embodiment, an attribute in a massive multi player online video game exists that allows the player character who controls it to reverse the outcome of a game parameter. The player character performs a game parameter. Once the outcome of the game parameter is established, the player character can use the reverse outcome attribute to reverse the outcome of the game parameter.

Examples of attributes that can be used for reverse outcomes are: 1. A spell 2. An object 3. a player character 4. an in game character 5. a player pet According to one embodiment, the "use reverse outcome attribute" can be limited. For example, the reverse outcome attribute may be limited to: 1. A certain race or class of player characters 2. A certain experience level of a player character 3. A certain time limit between uses 4. A maximum number of times the object can be used 5. A certain or increasing cost (in real or game currency)

Examples of game parameters in which the reverse outcome attribute may be employed include: 1. Player Character to Player Character—one player character defeats another player character in a duel. The defeated character uses the reverse outcome attribute which allows him to be the winner of the duel 2. Missions—a player character fails to complete a mission—the player character uses the reverse outcome attribute and the mission is flagged as completed by him. 3. Two player characters complete a game parameter together. One player character is rewarded with a game attribute for completing the mission. The other player character uses the reverse outcome game parameter to be rewarded with the game attribute instead of the first player character.

According to one embodiment, some game parameters cannot be successfully completed unless a reverse outcome attribute is used According to one embodiment, a player character can nullify the use of a reverse outcome attribute by using another reverse outcome attribute, or by using a re-reverse outcome attribute.

According to one embodiment, a player character can be automatically endowed with a reverse outcome attribute when he reaches a certain level of the game.

According to one embodiment, reverse outcomes attributes could only be available in certain eras of the game According to one embodiment, players could pay an extra fee to the server so that their characters can acquire and use reverse outcome attributes According to one embodiment, players could have a limited in game or real time to use the device once a game parameter result has been determined.

According to one embodiment, players could obtain a "block game reversal" attribute, which, when used against a game reversal attribute, may certainly or only possibly block the other player's use of the reverse outcome attribute.

According to one embodiment, a reverse outcome attribute may permit time travel. Players could then use the reverse outcome attribute to attempt to change the outcome of a completed even, action, etc. For example, if a player character fails to complete a mission, the player character may use the Time Travel attribute to attempt to complete the mission again, but now armed with foreknowledge of the game space and other game interactions, environmental conditions, etc. In this case, the outcome is not guaranteed to be reversed, only the possibility of a reversal is obtained by the player. As another example, where two player characters have dueled, the defeated character may use the Time Travel attribute to reset the game just prior to the duel, whereupon the player may again choose to dual or to make alternative choices before or during the dual in an effort to improve upon the outcome. Again, a change in outcome is not guaranteed under this scenario, only the possibility of a reversal is granted.

Accordingly, the present disclosure provides for hardware and software that can be utilized to create one or more, or a combination of, any of the above-described embodiments. Non-limiting examples of software programs that might be used for the realization of the above embodiments include, but are not limited to:

Game Program

Reverse Outcome Program

Time Travel Program

Examples of databases that might be used for the realization of the above embodiments include, but are not limited to:

Player Database including, for example, 1. Player GUID 2. Player Billing Information 3. Account Type 4. Characters 1-n Character Database including, for example, 1. Character GUID 2. Qualifies for Reverse Outcome Game Attribute? 3. Game Attributes 1-n Attribute Database including, for example, 1. Attribute ID 2. Attribute Descriptor 3. Attribute Powers 1-n 4. Attribute Reverse Outcome Probability Game Parameter Database including, for example, 1. Game Parameter ID 2. Descriptor 3. Conditions and Rules 4. Location Attempted Game Parameter Database including, for example, Parameter ID
Time Start and End
Parameter Result
Character IDs 1-n
Saved Parameter Session The present disclosure further provides methods by which the embodiments described above, alone or in combination, may be realized. Examples of methods that may be employed include, but are not limited to:

A method for allocating a reverse outcome attribute comprising: Receive indication that game parameter is complete Determine that successful game parameter completion qualifies player character for reverse outcome game parameter Determine if player character qualifies for reverse outcome game attribute If player character qualifies for reverse outcome game attribute, provide/distribute attribute to character A method to use a reverse outcome attribute comprising: Receive game parameter outcome Store game parameter Receive use of reverse outcome game attribute Determine if use of attribute is within time limit Apply reverse game parameter outcome if use of attribute is within time limit.

A method to acquire a Nullify reverse outcome attribute comprising: Receive indication that game parameter is complete Determine that successful game parameter completion qualifies player character for Nullify reverse outcome game parameter Determine if player character qualifies for reverse outcome game attribute If player character qualifies for reverse outcome game attribute, provide/distribute attribute to character A method to Nullify reverse outcome attribute comprising: Receive and store game parameter outcome Receive use of reverse outcome game attribute Receive nullification of reverse outcome game attribute Do not alter game parameter outcome A method to acquire time travel attribute comprising: Receive indication that game parameter is complete Determine that successful game parameter completion qualifies player character for time travel game parameter Determine if player character qualifies for time travel outcome game attribute If player character qualifies for time travel outcome game attribute, provide/distribute attribute to character A method to use time travel attribute comprising: Receive game parameter outcome Store game parameter Receive use of time travel outcome game attribute Determine if use of attribute is within time limit Apply time travel parameter outcome if use of attribute is within time limit by resetting game space to designated time and place with one or more characters affected Permit player(s) to re-enact designated time and game event Record new outcome in historical and present database as if it had originally occurred as re-enacted.

A method to acquire block time travel attribute comprising: Receive indication that game parameter is complete Determine that successful game parameter completion qualifies player character for Block Time Travel game parameter Determine if player character qualifies for Block Time Travel game attribute If player character qualifies for reverse outcome game attribute, provide/distribute attribute to character A method to use block time travel attribute comprising: Receive and store game parameter outcome Receive use of Block Time Travel game attribute Determine probability of successful use of Block Time Travel game attribute If successful do not alter game parameter outcome Of course it will be appreciated that such methods are provided for the purposes of example only and that none of the above methods should be interpreted as necessarily requiring any of the included steps nor should they be interpreted as necessarily excluding any additional steps.

According to another embodiment, the present disclosure provides a method to create in-game objects from digital images of real life objects in a video game. According to one method of practicing this embodiment, one or more digital photographs of an object are scanned into a massive multi player online video game environment. The player character who scans in the digital photograph may specify a size and material for the object. Based on the material and size specified, a price may be generated to manufacture the object. The player character can pay the price (in virtual or actual dollars) and the game will assemble the object as specified by the digital images.

According to another embodiment, the object can be assembled: 1. By the game server 2. By one or more computer generated character(s) in the game environment (i.e. a blacksmith that is a non player character) 3. By one or more player characters with the skills to assemble the item (i.e. a sword can be assembled by a player character with black smith skills)

According to another embodiment, materials to assemble the object can be obtained: 1. by purchasing from the game server 2. by purchasing from a computer generated character in the game server 3' by purchasing from a player character in the game server 4. by gathering them from the game environment (i.e. by mining ore) 5. by purchasing game tokens in the "real world" and exchanging them for materials in the virtual game space.

According to another embodiment, an in game price for assembling the object can be determined: 1. by the game server 2. by receiving bids from qualified computer generated characters 3. by receiving bids from qualified player characters 4. By outputting a price and receiving an acceptance of the output price by a player character to assemble the item. 5. Through an open, competitive market According to another embodiment, a price for tokens in the "real world" for subsequent in game redemption may be determined: 1. by the game maker 2. by the store owner 3. Through an open, competitive bid or marketplace 4. Or, a discreet and finite number of tokens in general or by type of resource may be distributed to an auction site where players may bid for one or more tokens.

According to another embodiment, offers to assemble objects can be stored, made and presented: 1. In a marketplace section of the game 2. In a trade chat window of the game 3. In an email that is sent to qualified non player characters According to another embodiment, offers can include: 1. a time limit 2. a price (in virtual or real currency or other bartered items) 3. one or more digital photos of an item to assemble 4. a list of materials the object needs to be made from 5. a list of additional enchantments required to make the attribute According to another embodiment, rather than using one or more digital photographs to specify the item, an item design can be made in Photoshop, AutoCAD, 3d Studio Max, Maya, Visio, or another drawing and/or rendering program and submitted to the system to be manufactured.

According to another embodiment, a player character who has agreed to assemble the item can create it with any of the above programs as long as they own the necessary amount of virtual raw materials needed to assemble it.

According to another embodiment, players can pay an extra fee to the server to allow their characters to either import objects to assemble in the game or assemble these objects for other player characters.

According to another embodiment, player characters contracting to assemble an item can subcontract with other player characters to assemble components of the item.

Examples of attributes of a newly formed item that can be specified include: 1. shelf life 2. strength, 3. hit power or points 4. defends against 5. penetrates armor types 6. extends life by X days, weeks, months, years, 7. reduces life by X, 8. purchase price 9. depreciation rate 10. invisible y/n 11. reload rate 12. lifespan 13. dominate class 14. Recessive class, etc. 15. Improves recovery rate 16. Improves armor types generally or against specified weapons According to another embodiment, physical limitations can be assigned to a game object. For instance, the weight, size, and shape of the object can be limited based on the player character for which the item is being made. For instance a helmet has to have a certain diameter, a sword has to have a certain handle size and weight, etc According to another embodiment, rather than money, player characters could pay or barter with contractors with other game attributes (items, raw materials, services, etc) in exchange for building a new item.

Accordingly, the present disclosure provides for hardware and software that can be utilized to create one or more, or a combination of, any of the above-described embodiments. Non-limiting examples of software programs that might be used for the realization of the above embodiments include, but are not limited to:

Game Program

Digital File Import Program

Object Creation Program

Examples of databases that might be used for the realization of the above embodiments include, but are not limited to:

Player Database including, for example, 1. Player GUID 2. Player billing info 3. Account type 4. Characters 1-n Character Database including, for example, 1. Character GUID 2. Character Attributes 3. Character Physical Limitations 4. New Items 1-n 5. New item status New Item Database including, for example, 1. New Item ID 2. Character ID 3. New Item Digital images 1-n 4. New Item blueprints 1-n 5. New Item materials 1-n 6. New Item Construction Cost 1-n 7. New Item Salvage Vale 1-n New Item Contract Database including, for example, 1. Contract ID 2. New Item ID 3. Item Materials 1-n 4. Item Blueprints 1-n 5. Contract Price including, for example, 6. Contractor ID 7. Subcontractor ID 1-n The present disclosure further provides methods by which the embodiments described above, alone or in combination, may be realized. Examples of methods that may be employed include, but are not limited to:

A method to specify a new item comprising: Receive digital image(s) of item from a player character Generate blue print of item Receive materials for each aspect of blueprint Determine physical limitations of item based on player character creating item and other conditions If item is within physical limitations allowed, generate price to assemble item Receive item price Assemble item Output item to player character A method to create a new item contract comprising: Generate blue print of item from digital images from a first player character Receive list of materials Determine material amounts Create and save request to assemble contract Receive request to fulfill contract Receive price to fulfill contract Output price to fulfill contract to first player character Receive acceptance of price Output acceptance of price to second player character A method to create a new item comprising: Receive request to assemble item from a player character Determine if player character qualifies to assemble item If player character qualifies, output list of required materials Receive appropriate materials Assemble item Output item to player character A method to fulfill a new item contract comprising: Assemble and Output item to a first player character Send item complete message to second player character Receive payment amount or barter object from second player character Receive item from first player character Release payment or barter object to first player character Release item to second player character Of course it will be appreciated that such methods are provided for the purposes of example only and that none of the above methods should be interpreted as necessarily requiring any of the included steps nor should they be interpreted as necessarily excluding any additional steps.

According to another embodiment, the disclosure provides methods and systems to provide inventory management of in-game items and attributes in a video game. Accordingly a game server or other system manages the number of particular objects that exist in a massive multi player online video game at any given time. Each computer or user generated item that exists in the game is given one or more maximum numbers and market value. When the market value for an item is reached in the game environment, then the maximum number is set to the amount specified.

Alternatively, the game server can set a market value for an item based on the number of items that exist in the game.

According to one embodiment, when a maximum number is adjusted in the game, additional items can be created by: 1. Allowing player characters to create the items 2. Allowing player characters to find the items on computer generated characters that they defeat in the game. 3. Allowing player characters to purchase the items from computer generated characters (NPCs)

According to one embodiment, the market value of the item can be determined in the game environment by: 1. The computer via computer generated characters that sell and stock the item 2. The player character to player character marketplace or auction According to one embodiment, items can be destroyed in a game by player characters or computer generated characters or events when: 1. they are used as components to create another item 2. they are consumed 3. they are broken down into their constituent components 4. they are used in a game parameter that destroys or alters them 5. the real or virtual time limit for their existence expires 6. The era in which they are allowed to exist lapses 7. they are buried, burned or sacrificed to a God According to one embodiment, in addition to allowing price to control the maximum number of items that exist in a game, the population on a game server can also control the maximum numbers of particular items that exist. Even more specifically the number of player characters that are of a certain race or class can also have an effect on the maximum number of particular items that exist in a game.

According to one embodiment, in addition to items, races, classes, skills, and attributes of player characters can also be managed as inventory. For instance, certain skills can only be acquired by x number of player characters in a given game environment.

According to one embodiment, rather than adjusting levels of items, a maximum number of items can be created and fixed. Players can accumulate items and corner markets on them.

According to one embodiment, when certain items become available in a game, they make other existing items obsolete. I.e. when a game environment reaches a certain age, certain inventory items become available. The ability to create these items may make other items no longer available and/or less effective, valuable or useful.

As another alternative method, the number of items may also be established or limited via a vote by the majority of the players within a given game space.

Accordingly, the present disclosure provides for hardware and software that can be utilized to create one or more, or a combination of, any of the above-described embodiments. Non-limiting examples of software programs that might be used for the realization of the above embodiments include, but are not limited to:
Game Program
New Item Creation Program
Item Management Program
Era Management Program Examples of databases that might be used for the realization of the above embodiments include, but are not limited to:
Character Database including, for example, 1. Character GUID 2. Item ID 1-n
Item Database including, for example, 1. Item ID 2. Item Quantity 3. Item Price 4. Maximum Quantity 5. Maximum Price 6. Salvage Value By Era 1-n 7. Expiration Date 8. Quantity/Player Character Ratio 9. Quantity/Price Ratio 10. Item Status The present disclosure further provides methods by which the embodiments described above, alone or in combination, may be realized. Examples of methods that may be employed include, but are not limited to:

A method to create items in a game based on max items allowed comprising: Retrieve Item ID Determine maximum number allowed based on conditions Determine if item id has equal or less than quantity to max allowed If item id has less than max allowed, create new items A method to create items in game based on market price comprising: Retrieve item id Determine whether item has exceeded a price threshold If item has exceeded price threshold, create new items in game A method to adjust maximum items in a game comprising: Receive indication that game parameter has been completed Determine if game parameter completion alters max number of available items in game If max number is altered, create new game items up to new maximum number Or Retrieve item id Determine if game conditions alter max quantity allowed of item id Adjust max number allowed and create new items to maximum number if game conditions allow.

A method to determine market value of items in a game comprising: Receive selling prices of an item id Store each selling price of item id Determine value of item based on range of selling prices A method to make items obsolete in game comprising: Receive indication that game has advanced to new era Retrieve item id(s) Determine if item is obsolete based on new era Flag item record as obsolete based on new era conditions Of course it will be appreciated that such methods are provided for the purposes of example only and that none of the above methods should be interpreted as necessarily requiring any of the included steps nor should they be interpreted as necessarily excluding any additional steps.

According to yet another embodiment, the present disclosure provides methods and systems to facilitate favors between player characters in a Video Game.

According to this embodiment, a player character can perform a favor for another player character. Favors can be defined by the game server or by the player character's themselves. When one player performs an activity that can be classified as a favor to a second player character, his player character account is flagged as being owed a favor by the second player character. Favors can be bought/sold by/to other player characters.

According to one embodiment, activities that are considered favors may include: 1. Freeing a player character who is a slave 2. Helping or instructing a player character complete a game parameter 3. Performing an activity for a player character that the player character defines as a favor 4. Providing a game attribute or other object to a character without charge or below the current market value According to one embodiment, the system can monitor and flag certain player character activity as favors, and keep track of favors performed automatically, or one player character can acknowledge that he owes another player character a favor by the first player character outputting a favor acknowledgement request and the second player character acknowledging that he owes the first player character a favor.

According to one embodiment, favors can be traded as currency.

According to one embodiment, favors can increase positive Karma.

According to one embodiment, failure to oblige a player who requests a favor may increase negative Karma.

According to one embodiment, when a first player character owes a second player character a favor, the second player character can automatically force the first player character to perform an activity to neutralize the favor. For instance, the first player character may have the ability to complete a game parameter. The second player character can force the first player character to fulfill his obligation of owing a favor by forcing the first player character to help the second player character complete a game parameter.

According to one embodiment, when a first player character owes a second player character a favor, and the second player character invokes the repayment of the favor, the second player character cannot continue normal game play until he has completed the game parameter required to fulfill his favor obligation. His game play can be inhibited by a pop up window that does not let him view the game world unless his favor is fulfilled.

According to one embodiment, when a first player character owes a second player character a favor, he can offer game attributes to fulfill the obligation of the favor.

According to one embodiment, certain game parameters cannot be completed by a player character unless he is given a favor by another player character. For instance, a first player character cannot cross a bridge unless the monster that controls the bridge is first put to sleep. The only way for the monster to go to sleep is if he eats the meat of a sheep that is raised by a goat herder who only sells the meat to a certain class of player characters. A second player character of that class can perform a favor to the first player character not of that class by purchasing meat from the goat herder and providing it to the first player character so that he can feed it to the monster and cross the bridge while the monster sleeps.

Another example would be: a second player character has enslaved the son of a first player character. The second player character will not speak to the first player character directly, but will speak through a third player character. The third player character can perform a favor for the first player character by speaking to the second player character about a ransom to free the first player character's son.

According to one embodiment, when a player character has no money, he can perform favors for other player characters. Once the favors are performed, they can be saved and invoked for later use, or sold back to the player characters that owe them or other player characters in the game environment.

According to one embodiment, player characters can post needed favors in a marketplace with the conditions that must be fulfilled in order for the favor to be accomplished. Player characters can view favor requests in the marketplace and accept them if their attributes allow them to perform the favor. Favor requests can be posted with virtual or actual cash or attribute values and the player character that completes the favor can elect to (i) take the virtual or real cash or attribute, or (ii) allow the player character who requested the favor to owe him a favor in return.

According to one embodiment, favors or obligations to perform and/or to receive favors may be bought/sold or bartered among multiple players.

According to one embodiment, players may pay in real or virtual currency to absolve themselves of an owed favor or debt.

According to one embodiment, favors can be obtained from player characters who are gods or government officials in a game by giving donations or successful/accepted sacrifices to those characters.

Accordingly, the present disclosure provides for hardware and software that can be utilized to create one or more, or a combination of, any of the above-described embodiments. Non-limiting examples of software programs that might be used for the realization of the above embodiments include, but are not limited to:

Game Program
Favor Program
Contract Management Program

Examples of databases that might be used for the realization of the above embodiments include, but are not limited to:

Character Database including, for example 1. Character GUID 2. Character Attributes 3. Character Favors 1-n Favor Contract Database including, for example 1. Favor ID 2. Favor Type 3. Favor Value 4. Favor conditions 5. Favor release conditions Favor Type Database including, for example 1. Favor Type ID 2. Favor Type conditions 3. Favor Release Conditions Contract Database including, for example 1. Contract ID 2. Contract Conditions 1-n 3. Interface with Game and Favor Programs The present disclosure further provides methods by which the embodiments described above, alone or in combination, may be realized. Examples of methods that may be employed include, but are not limited to:

A method comprising: Receive favor contract creation request from a first player character Receive conditions and release conditions of contract Store contract and bind first player to contract Receive indication that a second player character will perform the conditions of the player contract Bind second player to contract Receive indication that second player has performed conditions of contract Output conditions complete notification message to first player character Receive indication that release conditions for favor contract have been completed by the first player character Release first player character from favor contract with second player character A method to create a favor contract comprising: Receive indication that action has been performed by a player character Determine if action obligates a second player to pay a favor to the first player character Create Favor contract if action obligates second player Store Favor Contract A method to perform a favor comprising: Receive indication that a second player character will perform the conditions of the player contract Bind second player to contract Receive indication that second player has performed conditions of contract Output conditions complete notification message to first and second player character A method to fulfill a favor contract comprising: Output conditions complete notification message to first player character Receive indication that release conditions for favor contract have been completed by the first player character Release first player character from favor contract with second player character A method to sell or barter favors or favor contracts comprising: Receive indication that a first player desires to sell or barter a favor or favor contract Post ad on favor market or exchange page Receive indication that a second player desires to purchase for virtual or real cash or barter for the purchase of a favor or favor contract and the offer price or terms Output message to first player of second players offer Receive indication of acceptance, rejection or counter offer from first player Notify second player of acceptance, rejection or counter offer from first player Upon acceptance of a first offer or a mutually agreed upon counter offer record transfer of favor or favor contract to second player and either virtual or real cash or a bartered item(s), or a substitute favor to first player. Modify player database to reflect change in ownership/obligations of favor or favor contract and new ownership of consideration paid by second player Of course it will be appreciated that such methods are provided for the purposes of example only and that none of the above methods should be interpreted as necessarily requiring any of the included steps nor should they be interpreted as necessarily excluding any additional steps.

According to yet another embodiment, the present disclosure provides methods and systems to allow for genetic crossbreeding of parents to form children in a video game.

In this embodiment, player characters in a video game are assigned two chromosomes for each appropriate attribute they possess. When two player characters have reached an appropriate level in a game and are eligible to have a child, the attributes of the child are generated by taking one chromosome from each parent and combining them to form the attributes for the child.

Appropriate attributes can include but are not limited to: 1. the physical appearance of the character including skin, height, weight, hair and eye color 2. the race of the character 3. the class of the character 4. the skills of the character 5. the strength, intelligence, stamina, with, charisma, agility, etc of the character 6. the ability to improve any of said skills According to another embodiment, rather than having two chromosomes of an attribute, the system can take the average attribute score provided by the two parents, or randomly select within a range between the two attribute scores of the parents in order to determine the attribute value of the child. These scores could be determined from the value of the attribute of the parent when the child is conceived, or from the value of the attribute of the parent when his character was created.

According to another embodiment, the current value, score or level of each parent's attributes may be used to determine which chromosomes are dominant or recessive.

According to another embodiment, the system could determine which attributes are more fully developed in a given child based upon environmental considerations such as how often the child employs or uses a given attribute. Those attributes used most often during childhood can develop more fully while those less used may wane over time. The net overall growth of any given skill or attribute can therefore be a combination of the general proclivity to perform well as inherited from each parent and the child's use or actual development of said skill or attribute.

According to another embodiment, the system can randomly inject mutations into the attribute determination process so that children are not completely a product of the attributes of their parents. For instance, new attributes or different attributes can randomly occur in offspring. As an example, these mutations can occur: 1. Randomly 2. A certain number of times with each level of a family tree 3. A certain number of times in an era of the game 4. A certain number of times within each race and class of the game 5. More or less often depending on a character's race, class or family 6. More or less often depending on the era of the game environment 7. More or less often depending upon the child's actual usage or other development efforts. 8. Any combination of the above According to another embodiment, particular attributes can have recessive and dominant chromosomes that mirror real life traits. For instance blue eyes are recessive and brown eyes are dominant. Alternatively, this may be determined by established game rules and/or based upon parent's success and/or the child's environmental development as previously described.

According to another embodiment, before marrying or choosing to be a child of another player character, an existing or potential player character can view the genetic make up of the attributes of a player character, and, optionally, run a program to calculate the probabilities that a child will have certain attributes and characteristics given the known makeup of the parents.

According to another embodiment, the cost of marrying or being a child of a particular player character can be set by the system based on the attributes of the character and how desirable they are to have in potential offspring. According to another embodiment, Artificial Intelligence or Genetic Algorithms can be applied to this process to make it more rich and complex.

Accordingly, the present disclosure provides for hardware and software that can be utilized to create one or more, or a combination of, any of the above-described embodiments. Non-limiting examples of software programs that might be used for the realization of the above embodiments include, but are not limited to:
  Game Program
  New Character Creation Program
  Examples of databases that might be used for the realization of the above embodiments include, but are not limited to:
  Character Database including, for example 1. Character ID 2. Character inheritable attributes 1-n 3. Character Chromosomes
  Mutation Database including, for example 1. Mutation ID 2. Mutation descriptor 3. Mutation attributes 1-n The present disclosure further provides methods by which the embodiments described above, alone or in combination, may be realized. Examples of methods that may be employed include, but are not limited to:
  A method comprising: Receive request to create new player character from one or more existing player characters Determine if one or more existing player characters qualify to create new player character If existing player(s) qualify retrieve inheritable attributes: Apply new character creation program to attributes Create new player character based on inheritable attributes of existing player character(s) and new character creation program; and Allow new player character to enter game environment A method to create a new character from chromosomes of parents comprising: Receive request to create new player character from one or more existing player characters Determine if existing player character(s) qualify to create new player character If character(s) qualify, retrieve character chromosomes Apply new character creation program to character chromosomes Create new character based on existing player character chromosomes and new character creation program Allow new player character to enter game environment A method to create a new character from average attributes of parents comprising: Receive request to create new player character from one or more existing player characters Determine if existing player character(s) qualify to create new player character If character(s) qualify, retrieve character inheritable attributes Generate the average number of each inheritable attribute Create new character based on average number of each inheritable attribute and Allow new player character to enter game environment A method to apply a random mutation to a new character comprising: Receive request to create new player character from one or more existing player characters Determine if one or more existing player characters qualify to create new player character If existing player(s) qualify retrieve inheritable attributes Apply new character creation program to attributes Retrieve mutation rules Determine if new character qualifies for mutation based on rules Create new player character based on inheritable attributes of existing player character(s) new character creation program, and applicable mutation rules Allow new player character to enter game environment The invention is described with reference to several embodiments. However, the invention is not limited to the embodiments disclosed, and those of ordinary skill in the art will recognize that the invention is readily applicable to many other diverse embodiments and applications. Accordingly, the subject matter of the present disclosure includes all novel and nonobvious combinations and subcombinations of the various systems, methods and configurations, and other features, functions, and/or properties disclosed herein.

It will be appreciated that such methods are provided for the purposes of example only and that none of the above methods should be interpreted as necessarily requiring any of the included steps nor should they be interpreted as necessarily excluding any additional steps.

What is claimed is:
1. A method performed by a computer, the method comprising:
  retrieving, by a Video Game Central Server, a plurality of player attributes of a player;
  determining, by the Video Game Central Server, if the plurality of player attributes qualify for a relationship;
  if the attributes qualify for a relationship, flagging, by the Video Game Central Server, a character account of the player as eligible for a relationship:
  outputting, by the Video Game Central Server, relationship availability to the player character;
  retrieving, by the Video Game Central Server, a request to form a relationship by contract;
  outputting, by the Video Game Central Server, parameters for the contract;

receiving, by the Video Game Central Server, conditions for the contract;

creating, by the Video Game Central Server, a new relationship contract record based on the conditions for the contract;

receiving, by the Video Game Central Server, an indication that a first player character desires to enter into a parent-child contract;

determining, by the Video Game Central Server, if a child relationship contract is available for the first player character; and outputting, by the Video Game Central Server, an available parent-child contract.

2. The method of claim 1 further comprising:

receiving, by the Video Game Central Server, a request to sever the relationship;

determining, by the Video Game Central Server, that the request to sever is permitted based upon the conditions for the contract; and severing, by the Video Game Central Server, the relationship.

3. The method of claim 2 further comprising:

determining, by the Video Game Central Server, additional conditions that must be met in order for the relationship to be severed;

outputting, by the Video Game Central Server, to the player, additional conditions that must be met in order for the relationship to be severed; and determining that the additional conditions have been met.

4. The method of claim 1 further comprising:

retrieving, by the Video Game Central Server, a relationship contract;

determining, by the Video Game Central Server, if the relationship contract is eligible to be severed;

outputting, by the Video Game Central Server, an offer to sever the relationship contract;

receiving an acceptance of the offer;

severing, by the Video Game Central Server, the contract; and updating, by the Video Game Central Server, a relationship contract record to reflect the severed contract.

5. The method of claim 1 further comprising receiving, by the Video Game Central Server, an acceptance of the parent-child contract.

6. The method of claim 5 further comprising generating, by the Video Game Central Server, a genetic profile of the child player character based on part on the genetic profile of at least one parent player character.

7. The method of claim 6 further comprising creating, by the Video Game Central Server, a child player character with the generated genetic profile of the child.

* * * * *